US012782659B2

(12) United States Patent
Brusberg et al.

(10) Patent No.: US 12,782,659 B2
(45) Date of Patent: Nov. 3, 2026

(54) SYSTEMS, APPARATUS, AND METHODS FOR ALIGNMENT OF INTEGRATED WAVEGUIDES AND OPTICAL FIBERS

(71) Applicant: CORNING RESEARCH & DEVELOPMENT CORPORATION, Corning, NY (US)

(72) Inventors: Lars Martin Otfried Brusberg, Corning, NY (US); Jason Roy Grenier, Horseheads, NY (US); Jürgen Matthies, Ruhr (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 271 days.

(21) Appl. No.: 18/381,405

(22) Filed: Oct. 18, 2023

(65) Prior Publication Data

US 2024/0045154 A1 Feb. 8, 2024

Related U.S. Application Data

(63) Continuation of application No. PCT/US2022/024515, filed on Apr. 13, 2022.
(Continued)

(51) Int. Cl.
*G02B 6/42* (2006.01)
*G02B 6/38* (2006.01)

(52) U.S. Cl.
CPC ......... *G02B 6/4292* (2013.01); *G02B 6/3825* (2013.01); *G02B 6/3882* (2013.01); *G02B 6/3893* (2013.01); *G02B 6/3897* (2013.01)

(58) Field of Classification Search
None
See application file for complete search history.

(56) References Cited

U.S. PATENT DOCUMENTS 10,345,535 B2 7/2019 Butler et al.
10,534,140 B2 1/2020 Barwicz et al.
(Continued)

FOREIGN PATENT DOCUMENTS

CN 110945976 A 3/2020
DE 102017112132 A1 12/2018
(Continued)

OTHER PUBLICATIONS

Translation of WO2019195219A1 (Year: 1019).*
(Continued)

*Primary Examiner* — Chad H Smith
(74) *Attorney, Agent, or Firm* — Tamika A. Crawl-Bey

(57) ABSTRACT

Systems and methods are provided for aligning a substrate with an optical fiber. A system comprises an optical fiber and a substrate with one or more optical waveguides, guide pin(s), and a substrate body comprising a receiving feature configured to receive and connect with the guide pin(s). The system also comprises an adapter having a pair of opposing walls defining a spacing therebetween. The adapter is configured to receive and connect to the substrate body in between the pair of opposing walls. The system also comprises a plug defining a hole(s) that is configured to receive the guide pin(s). The plug is configured to receive and connect the optical fiber. Connection of the adapter and the substrate body and connection of the adapter and the plug restrain movement of the optical fiber relative to the substrate.

19 Claims, 22 Drawing Sheets

Related U.S. Application Data

(60) Provisional application No. 63/177,473, filed on Apr. 21, 2021.

(56) References Cited

U.S. PATENT DOCUMENTS

| | | | |
|---|---|---|---|
| 10,739,519 | B2 | 8/2020 | Watt et al. |
| 11,054,574 | B2 | 7/2021 | Brusberg et al. |
| 11,256,042 | B2 | 2/2022 | Evans et al. |
| 11,372,169 | B2 | 6/2022 | Evans et al. |
| 2018/0267255 | A1 | 9/2018 | Butler et al. |
| 2018/0335587 | A1 | 11/2018 | Jou et al. |
| 2021/0018697 | A1 | 1/2021 | Evans et al. |
| 2021/0271037 | A1 | 9/2021 | Brusberg et al. |

FOREIGN PATENT DOCUMENTS

| | | | | | |
|---|---|---|---|---|---|
| WO | WO-2018220005 | A1 | * | 12/2018 | ........... G02B 6/4219 |
| WO | 2019/195220 | A1 | | 10/2019 | |
| WO | WO-2019195219 | A1 | * | 10/2019 | ........... G02B 6/3825 |

OTHER PUBLICATIONS

Translation of WO-2018220005-A1 (Year: 2018).*

R. C. A. Pitwon et al., "Pluggable Electro-Optical Circuit Board Interconnect Based on Embedded Graded-Index Planar Glass Waveguides," in Journal of Lightwave Technology, vol. 33, No. 4, pp. 741-754, 15 Feb. 15, 2015.

International Search Report and Written Opinion of the International Searching Authority; PCT/US2022/024515; mailed on Jun. 10, 2022, 13 pages; European Patent Office.

* cited by examiner

SYSTEMS, APPARATUS, AND METHODS FOR ALIGNMENT OF INTEGRATED WAVEGUIDES AND OPTICAL FIBERS

PRIORITY APPLICATIONS

This application is a continuation of International Patent Application No. PCT/US2022/024515 filed on Apr. 13, 2022, which claims the benefit of priority of U.S. Provisional Application No. 63/177,473, filed on Apr. 21, 2021. The content of each aforementioned application is relied upon and incorporated herein by reference in its entirety.

FIELD

Embodiments of the present invention relate to connection systems and methods for effectively aligning integrated waveguides and optical fibers.

BACKGROUND

Optical fibers are used for routing optical signals over long distances (e.g., wide area network (WAN), metropolitan area network (MAN), local area networks (LAN), racks, etc.). By contrast, optical interconnects (e.g., waveguides) are integrated in substrate materials like glass, polymer, silicon or others for short reach interconnects with lengths of up to ~1 m.

For the optical interface between the optical fiber and integrated waveguides, a connector solution that is standardized, low cost, and high performance is desirable. Some specific types of connectors (e.g., Multi-fiber Termination Push-on (MTP) connectors and Multi-fiber Push-on (MPO) connectors) have been developed that are state-of the art solutions for multi-fiber connectors in datacenters and other applications. Ion-exchange (IOX) optical waveguides are a promising technology for fabrication of low-loss on-board optical interconnects. To enable and deploy the waveguide technology in datacenters, high-performance computers, and other applications, a standard interface is desirable between the optical fiber(s) and integrated waveguides.

An approach for effectively aligning waveguides and optical fibers in a cost-effective manner are therefore desired.

SUMMARY

Alignment between the waveguides and optical fiber(s) can be difficult. Further, maintaining a small form factor to enable attachment and management of many different optical fibers is desirable. In this regard, various features may be employed to aid in alignment. However, such features each require alignment and have their own dimensions and geometries that have to be accounted for. This often means that connection using several different components results in intolerances "stacking" on top of each other, leading to additional inaccuracies in alignment.

Some current interfaces require active alignment in order to account for such difficulties in obtaining proper alignment. Where active alignment is used, a powered system is required to align the system that transmits optical test signals and seeks to optimize the optical test signals. Active alignment, however, is costly and time-consuming.

Systems, components, and methods described herein enable easy and proper alignment of a substrate and waveguides therein with an optical fiber. This may be accomplished through passive alignment, which permits cost-efficient assembly of components.

Various embodiments of the present invention provide one or more components for connecting and aligning one or more optical fibers to one or more waveguides on a substrate (e.g., planar glass waveguides, such as IOX, deposited, laser written waveguides). An adapter may be provided that is configured to envelop the edge of a substrate body of a substrate. The material of the substrate body (e.g., glass, silicon, polymer) may be processed (e.g. through laser writing or etching) to make an optical facet and/or to provide mechanical alignment features for very precise alignment of the mechanical features with other components. In some embodiments, all components may be passively aligned directly to the substrate by automated machines, enabling high-volume processing which leads to higher yield and cost savings.

In some embodiments, various features can be processed into a top surface of a substrate body of the substrate, which may lead to large scale panel level processing (cost savings) and quality improvements through inspection (top view microscopy) to find non-good parts (out of specifications). Further, in some embodiments, guide pins can be used and be directly attached to the substrate body, and this may reduce the stack of tolerances and lead to lower coupling loss and better performance.

In an example embodiment, a system is provided for aligning a substrate with optical fibers. The system comprises an optical fiber and a substrate. The substrate comprises one or more waveguides, and at least one guide pin. The one or more waveguides may be optical waveguides. The at least one guide pin defines a first end and a second end. The substrate also comprises a substrate body, and the substrate body has a receiving feature configured to receive and removably or permanently connect with the first end of the at least one guide pin. The first end for the at least one guide pin is received and removably or permanently connected within the substrate body. The second end for the at least one guide pin extends outwardly from the substrate body. The system further comprises an adapter having a pair of opposing walls, and the pair of opposing walls defines a spacing between the pair of opposing walls. The spacing size of the spacing corresponds to a thickness of the substrate body. The adapter is configured to receive and removably or permanently connect with the substrate body between the pair of opposing walls. The system further comprises a plug defining at least one guide pin hole that is configured to receive the second end of the at least one guide pin, and the plug is configured to receive and permanently connect with the optical fiber. The adapter and the plug are configured to be removably connected together. The second end for the at least one guide pin is configured to engage with the at least one guide pin hole to align the optical fiber of the plug with the one or more waveguides. Connection of the adapter and the substrate body and connection of the adapter and the plug restrains movement of the optical fiber relative to the substrate.

In some embodiments, the adapter comprises a clip, wherein the clip comprises a first section extending into and biased toward the spacing, wherein the first section of the clip is configured to provide a force against the substrate body when the substrate body is positioned between the pair of opposing walls so as to aid in connection of the adapter to the substrate.

In some embodiments, the adapter comprises a clip. This clip comprises a first section that presses against the substrate body of the substrate to restrain movement of the substrate relative to the adapter. The first section is configured to shift depending on an amount of force applied to the first section so that the spacing size varies.

In some embodiments, the substrate body defines a first surface and an alignment feature in the first surface, wherein the alignment feature is configured to receive a protrusion of the adapter to aid in alignment of the adapter during connection of the adapter to the substrate.

The plug may be a Multi-fiber Push-on (MPO) connector in some embodiments. Adhesive may be provided that is configured to permanently connect the adapter and the substrate together.

In some embodiments, the plug comprises a ferrule and a spring. The ferrule is positioned between the substrate and the spring. The ferrule is configured to receive the optical fiber and the at least one guide pin. When the at least one guide pin is shifted towards the plug, the spring generates a force against the ferrule and urges the ferrule towards the substrate. The spring may be configured to urge the ferrule against the substrate in some embodiments, and the ferrule may be a Mechanical Transfer (MT) ferrule.

In some embodiments, the system may further comprise an anti-reflection coating or an index matching material, and the optical fiber may comprise an end-face. The spring may be configured to urge the ferrule proximate to the substrate while leaving a gap between the end-face of the optical fiber and the one or more waveguides of the substrate. The anti-reflection coating or index matching material is deposited against the end-face. In some embodiments, the force generated by the spring is between 1 N and 25 N and the anti-reflection coating or the index matching material contacts the optical fiber and the one or more waveguides. In some embodiments, the force generated by the spring is between 1 N and 15 N and the anti-reflection coating or the index matching material contacts the optical fiber and the one or more waveguides. In some embodiments, the force generated by the spring is between 1 N and 5 N and the anti-reflection coating or the index matching material contacts the optical fiber and the one or more waveguides.

In some embodiments, the receiving feature is a trench. The trench may comprise two side edges and a bottom surface, and the trench is configured so that the at least one guide pin rests against the two side edges without contacting the bottom surface. In some embodiments, the trench may comprise at least two side walls, and the trench is configured so that the at least one guide pin rests against the at least two side walls. The trench may be formed using a laser based approach that may be combined with etching. Further, the one or more waveguides may be buried or subsurface waveguides. Alternatively, the waveguides may be surface waveguides.

In another example embodiment, an adapter for aligning a substrate with an optical fiber is provided. The adapter comprises a pair of opposing walls defining a spacing between the pair of opposing walls. The adapter is configured to be removably or permanently connected between a substrate and a plug. A spacing size of the spacing corresponds to a thickness of a substrate body of the substrate. The adapter is configured to receive the substrate body between the pair of opposing walls, and the adapter is configured to be removably connected to the plug. Connection of the adapter and the substrate body and connection of the adapter and the plug restrains movement of the optical fiber relative to the substrate. The adapter is configured to properly align one or more waveguides in the substrate with an optical fiber permanently connected to the plug.

In some embodiments, the adapter comprises a clip that comprises a first section extending into and biased toward the spacing, wherein the first section of the clip is configured to provide a force against the substrate body when the substrate body is positioned between the pair of opposing walls so as to aid in the removable or permanent connection of the adapter to the substrate. The clip may be configured to restrain movement of the optical fiber relative to the substrate.

The adapter may also define a void that is configured to receive a ferrule, and the void may be positioned to permit the ferrule to abut the substrate. In some embodiments, the adapter comprises a first side and a second side. The adapter is configured to receive the substrate at the first side, and the adapter is configured to removably connect with the plug at the second side.

In yet another example embodiment, a method is provided for aligning a substrate with an optical fiber. The method comprises providing an adapter having a pair of opposing walls defining a spacing between the pair of opposing walls. The method also comprises providing a substrate having one or more waveguides, at least one guide pin defining a first end and a second end, and a substrate body. The substrate body has a receiving feature that may be removably or permanently connected with the first end of the at least one guide pin. The method also comprises providing a plug defining at least one guide pin hole, and this plug includes an optical fiber permanently connected within the plug. The method also comprises attaching the adapter to the substrate and attaching the plug to the adapter.

In some embodiments, the method further comprises providing a ferrule and a spring within the plug, wherein, when the plug is attached to the adapter, the ferrule is between the substrate and the optical fiber. During attachment of the plug to the adapter, as the at least one guide pin is shifted towards the plug, the spring generates a force against the ferrule and urges the ferrule towards the substrate.

In some embodiments, the method further comprises applying adhesive to permanently connect at least two of the adapter, the substrate, the ferrule, the plug, and the optical fiber together. Attachments may be made without the use of adhesives in certain embodiments. In some embodiments, the plug is a Multi-fiber Push-on (MPO) connector.

In some embodiments, the method further comprises aligning the at least one guide pin with the at least one guide pin hole of the plug and receiving a second end of the at least one guide pin in the at least one guide pin hole. The at least one guide pin may be aligned, for example, with at least one guide pin hole within a ferrule, which may be provided within the plug.

Further areas of applicability of the present invention will become apparent from the detailed description provided hereinafter. It should be understood that the detailed description and specific examples, while indicating example preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DETAILED DESCRIPTION

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Figure 1A:
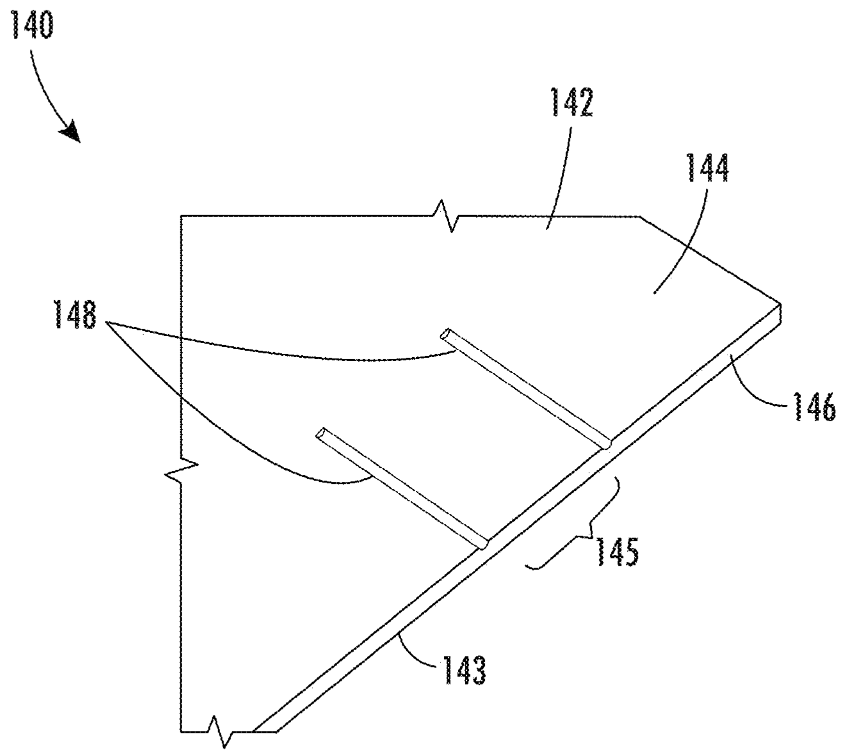
FIG. 1A is a perspective view of a substrate showing a substrate body having a receiving feature, in accordance with some embodiments discussed herein.
Figure 1B:
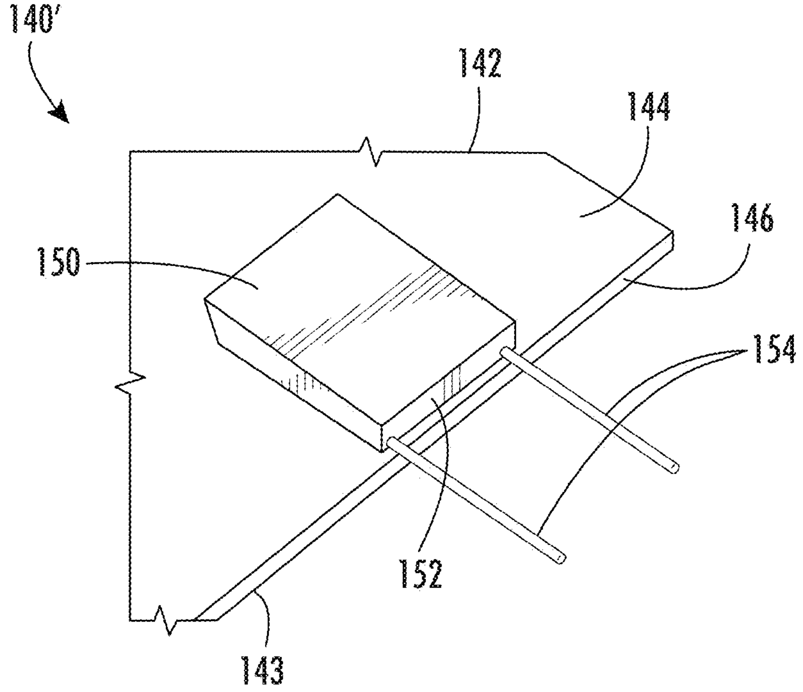
FIG. 1B is a perspective view of the substrate of FIG. 1A with a guide pin received in each receiving feature, in accordance with some embodiments discussed herein.
Figure 1C:
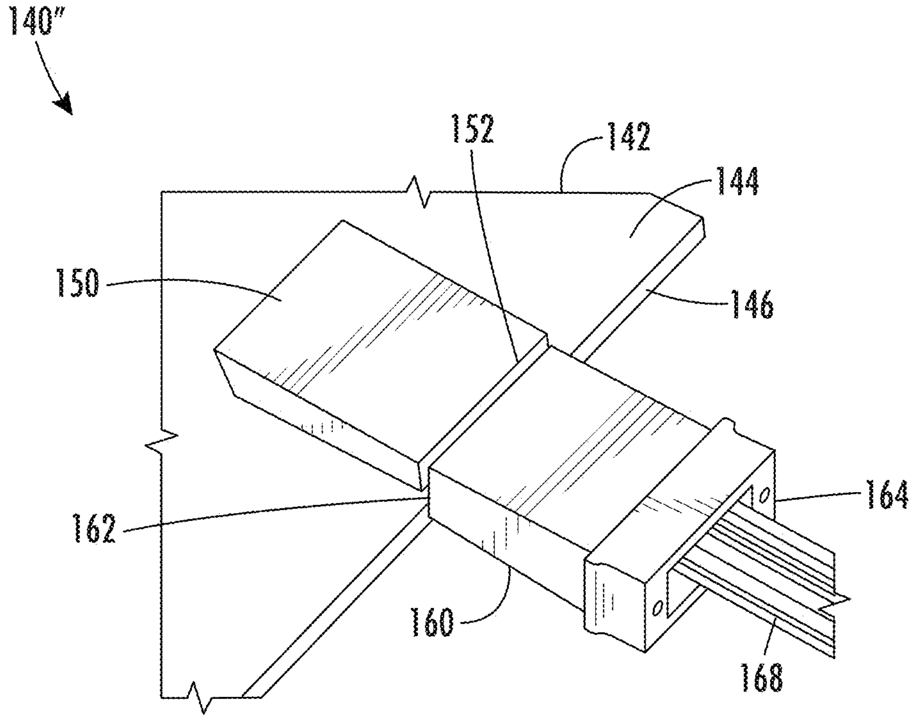
FIG. 1C is a perspective view of the substrate of FIG. 1B with guide pins received within a plug, in accordance with some embodiments discussed herein.

As noted above, improvements are desired to previous approaches for forming connections between a substrate and optical fibers. Embodiments discussed herein provide systems and components that are easy to manufacture and easy to use, along with corresponding methods. FIGS. 1A-1C illustrate a substrate that may be used.

FIG. 1A is a perspective view of a portion of a substrate 140. This substrate 140 may comprise one or more waveguides. These waveguides may be buried or surface waveguides. The substrate 140 may also comprise a substrate body 142. This substrate body 142 may have an upper surface 144, an edge 146, and a bottom surface 143. The substrate body 142 may also comprise two receiving features 148. These receiving features 148 are each configured to receive and removably or permanently connect the first end of a guide pin 154 (shown in FIG. 1B). In some embodiments, the guide pin 154 may be permanently connected to the receiving feature 148 using adhesive. Alternatively, the guide pin 154 may be removably connected to the receiving feature without adhesive (e.g., via a compression fit or other connection means). A second end for the guide pins 154 extends outwardly from the substrate body 142. In some embodiments, a 2D array of waveguides at the end-face of the substrate body 142 is possible. Waveguides may be spaced apart from each other incrementally (e.g., 165, 250, or 500 micron spacing) and can be different in geometry and/or spacing in the horizontal and vertical direction.

The receiving features 148 may be provided at the upper surface 144 of the substrate body 142. The receiving features 148 may be provided as a recess within the substrate body 142, and these recesses may take various shapes. For example, the recesses may have a semi-circular shape, a rectangular shape (e.g., form trenches), a triangular shape, etc. In some embodiments, the shape of the receiving features 148 matches the shape of guide pins 154 that the receiving features 148 are configured to be used with. Receiving features 148 may be separated by a distance 145. The positioning of the receiving features 148 may be configured to enable appropriate alignment between the substrate body 142 and the plug 164 and/or the optical fibers 168 (such as through the housing 160).

FIG. 1B is a perspective view of a substrate 140'. The substrate 140' comprises a guide pin 154 received in each receiving feature 148. Additionally, a cover 150 is provided having an end face 152. Recesses may be provided within the cover 150 where guide pins 154 may be at least partially received. These recesses may extend from a central portion of the cover 150 to the end face 152. In some embodiments, adhesive may be used to permanently connect the cover 150 and the guide pins 154, but adhesive may not be used in other embodiments.

FIG. 1C is a perspective view of a substrate 140", where the guide pins 154 (shown FIG. 1B) are received within a plug 164. As illustrated, optical fibers 168 may be received within the plug 164. In some embodiments, the plug 164 may permanently or removably connect with the optical fibers 168 so that the movement of the optical fibers 168 is at least partially restrained. In some embodiments, a ferrule may be provided within the plug 164, and the optical fiber 168 may be received and permanently or removably connected within the ferrule. Adapter 160 may comprise one or more guide holes. A second end for the guide pins 154 extends outwardly from the substrate body 142, and the second end of a guide pin may be received within a guide hole 164 (that described connection is hidden by the housing 160). In some embodiments, when the guide pin 154 is received within the guide hole, the movement of the substrate 140" may be constrained relative to the adapter 160.

Figure 2A:
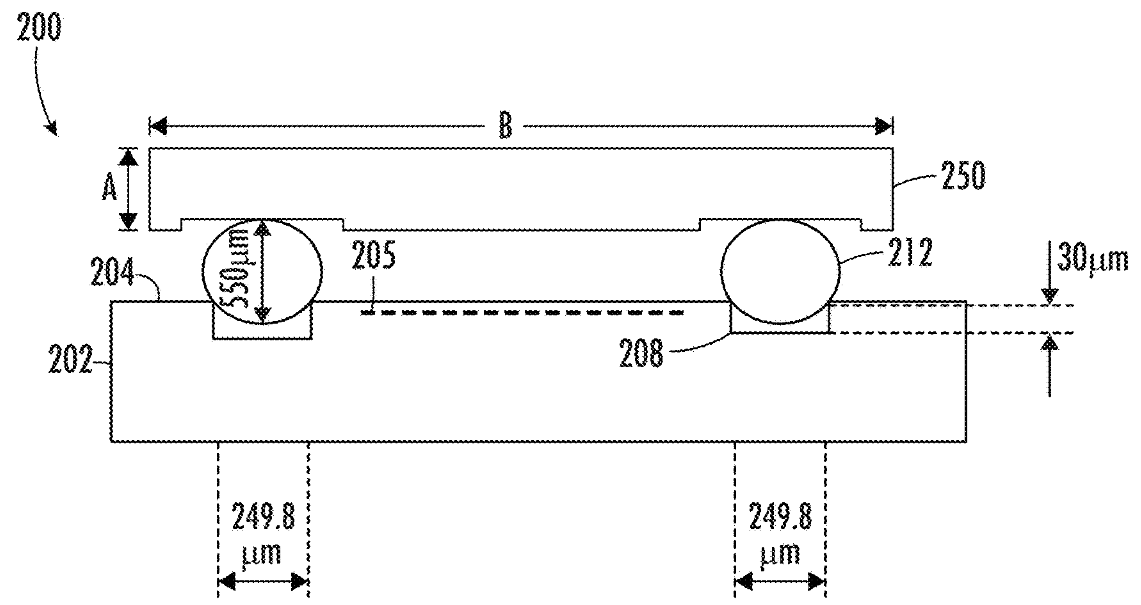
FIG. 2A is a side view of a substrate having two receiving features where guide pins are received in each of the receiving features, in accordance with some embodiments discussed herein.
Figure 2B:
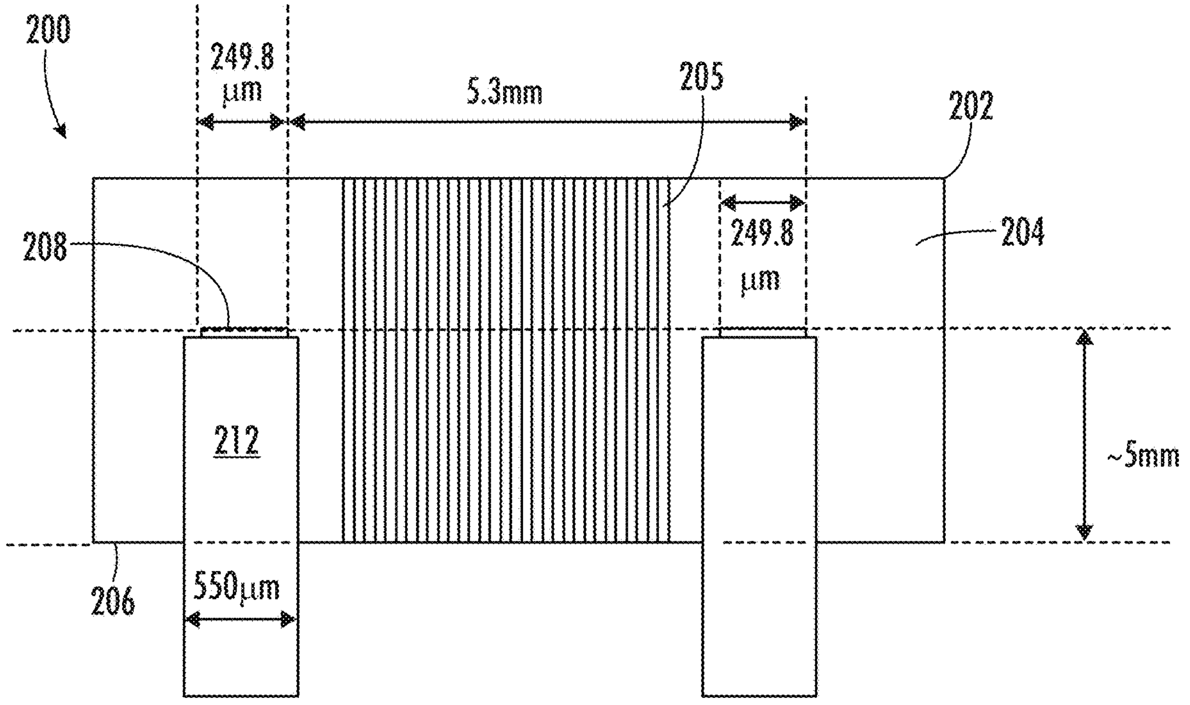
FIG. 2B is a top view of the substrate of FIG. 2A, in accordance with some embodiments discussed herein.

The substrate may be provided with dimensions to permit the accurate and reliable alignment of the substrate with the adapter. This may in turn permit the waveguides within the substrate to be accurately aligned with optical fibers. Each optical fiber may, in some embodiments, be connected to a single waveguide within the substrate, and, in some embodiments, a plurality of optical fibers may align with a plurality of waveguides. Accurate alignment may permit lower optical coupling losses of 0.75 dB or less. FIGS. 2A-2B illustrate some of these dimensions in an example embodiment. FIG. 2A is a side view of a substrate 200 and guide pins 212, and FIG. 2B is a top view of the substrate 200 and the guide pins 212 of FIG. 2A. The substrate 200 comprises one or more waveguides 205. These waveguides may be made with ion-exchange, laser writing, and/or deposited layers on a surface of the substrate body 202. The substrate 200 also comprises a substrate body 202 having an upper surface 204. The substrate body 202 comprises two receiving features 208. The receiving features 208 are configured to receive a guide pin 212.

These receiving features 208 may be trenches that are formed at the upper surface 204. However, V-shaped grooves or other approaches may serve as receiving features 208. It may be difficult to maintain the depth of a trench within the tolerances required to appropriately align the substrate 200 with the plug 164 (FIG. 1C). The depth of the trench can be formed with low tolerances, but approaches for accomplishing this can be costly. By contrast, the width of the trench may be maintained at low tolerances in a cost-effective manner. Using laser ablation (e.g. using a nanosecond (ns), picosecond (ps), or femtosecond (fs) pulsed laser), the position of the side edges may be provided with sub-micron accuracy in a cost effective manner. Consequently, where a trench is used, the trench may comprise two side edges and a bottom surface, and the trench may be configured such that a guide pin 212 rests against the two side edges without contacting the bottom surface. An example of this is illustrated in FIG. 2A. With this approach, the positioning of the guide pin 212 will be effectively controlled by the side edges of the trench. The bottom surface will not be configured to come into contact with a guide pin 212, so the trench may be formed while using higher tolerances for the trench depth. Thus, trenches may be reliably formed in a cost-effective manner. In some embodiments, the trench comprises at least two side walls, and the trench is configured so that the guide pin(s) rest against the at least two side walls. In some embodiments, the trenches may be formed using a laser based approach, which may permit even more cost savings.

Laser ablation also may be conducted for a variety of materials, and it may use a focused pulsed laser beam to remove small fractions of the substrate material to form micropatterns on the substrate. Laser ablation also provides a green approach as toxic chemicals and reagents need not be used.

In some embodiments, the guide pins 212 may be provided having a thickness of 550 μm, the receiving feature 208 may be provided in the form of a trench having a trench width of 249.8 μm, and the trench may have a depth of 30 μm. Additionally, the trench may comprise a length of approximately 5 mm to permit approximately 5 mm of the guide pin to be received. The receiving features 208 may be offset at 5.3 mm increments. This offset may be measured from a side edge of a receiving features 208 to the same respective side edge of an adjacent receiving features 208 as shown in FIG. 2B. However, these dimensions may change in other embodiments.

Figure 3A:
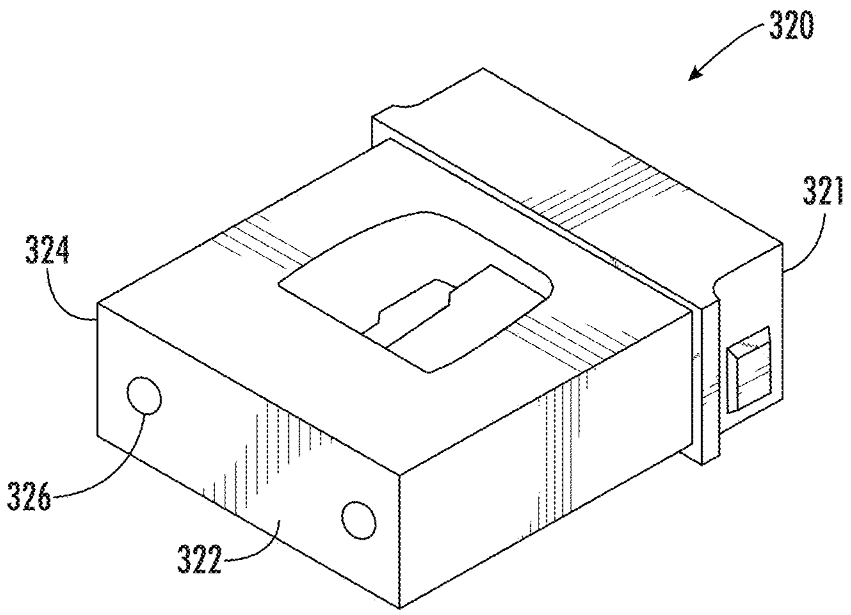
FIG. 3A is a perspective view of a ferrule of a multi-fiber optical plug useable with the alignment pins and the substrate of FIGS. 2A and 2B, in accordance with some embodiments discussed herein.

In some embodiments, a ferrule may be used to assist in aligning the waveguides within a substrate with optical fibers. FIGS. 3A-3D provide views of different ferrules that may be used in certain embodiments. FIG. 3A is a perspective view of a ferrule 320. This ferrule 320 may be provided as part of the plug 164 (FIG. 1C) in some embodiments. The plug 164 and the ferrule 320 may be configured so that the ferrule 320 may be partially or fully received within the plug 164. The ferrule 320 includes a body 324, a rear end 321, and a front end 322. The ferrule may also have guide holes 326 for receiving guide pins 154 (FIG. 1B) or 212 (FIGS. 2A-2B) extending through the body 324 between the rear end 321 and the front end 322. A suitable number of guide holes 326 may be provided, and the guide holes 326 may be provided in any suitable pattern. Guide holes 326 may extend through the front end 322 to expose terminated and polished ends of optical fibers 168 (FIG. 1C) within the plug 164 (FIG. 1C).

Figure 3B:
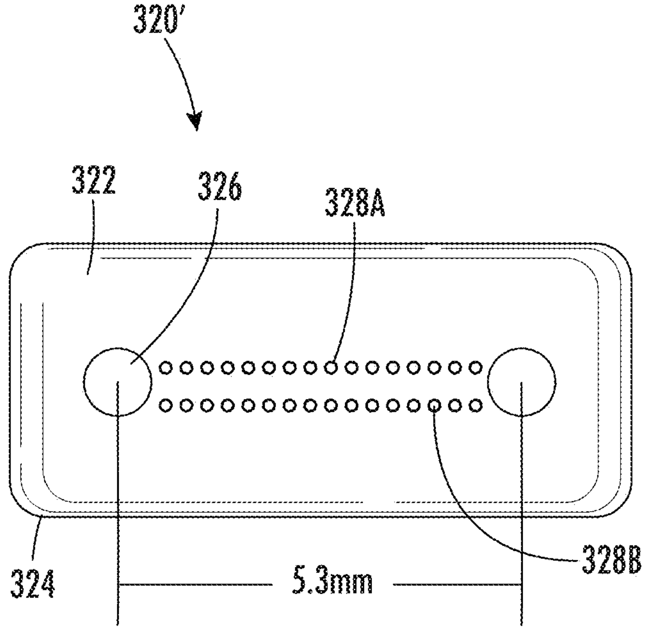
FIGS. 3B and 3C are end elevational views of a ferrule with different numbers of optical fiber bores and different alignment hole spacing, in accordance with some embodiments discussed herein.
Figure 3C:
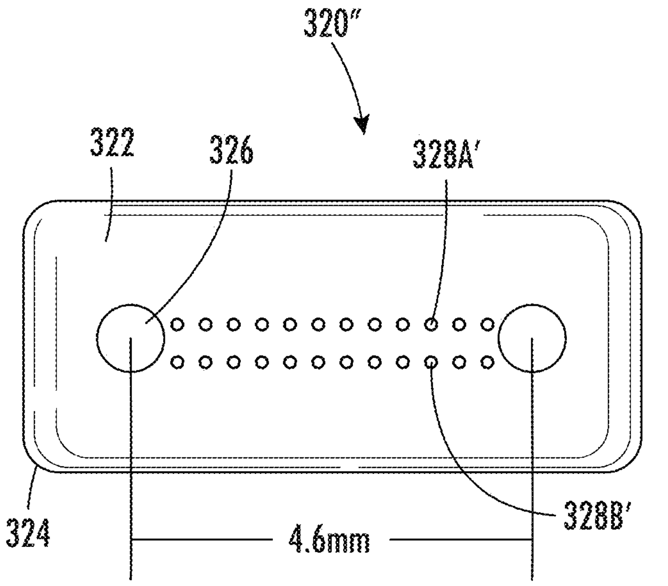

FIGS. 3B and 3C are end elevational views of a ferrule 320', 320" that is similar to the ferrule 320 illustrated in FIG. 3A. These views allow the front end 322 of the respective ferrule 320', 320" to be seen. As shown, guide holes 326 may extend from the front end 322 into the body 324 of the ferrules 320', 320". In various implementations, any suitable number of optical fiber bores and any suitable spacing between alignment holes may be provided. In both FIG. 3B and FIG. 3C, two rows of optical fiber bores 328A, 328B, 328A', 328B' are provided. Although multiple rows of optical fiber bores are shown in FIGS. 3B and 3C, in certain embodiments only a single row of optical fiber bores may be populated with optical fibers and/or used to interface with waveguides integrated within a substrate 200 (FIG. 2A-2B) (e.g., including electrically conductive vias) as disclosed herein, since such a substrate may have waveguides arranged at one depth therein or multiple layers of waveguides. The ferrules may comprise a multi-fiber optical connector with one or multiple fiber rows.

The ferrules 320', 320" illustrated in FIG. 3B and FIG. 3C have different numbers of optical fiber bores 328A, 328B and different spacing between alignment holes 326. As illustrated in FIG. 3B, the alignment holes 326 are offset 5.3 mm away from each other. By contrast, in FIG. 3C, the alignment holes 326 are offset 4.6 mm away from each other. Further, the ferrule 320' illustrated in FIG. 3B has sixteen optical fiber bores 328A, 328B provided on each row so that thirty-two optical fiber bores 328A, 328B are provided in total. By contrast, the ferrule 320" illustrated in FIG. 3C has twelve optical fiber bores 328A', 328B' provided on each row so that twenty-four optical fiber bores 328A', 328B' are provided in total.

Figure 3D:
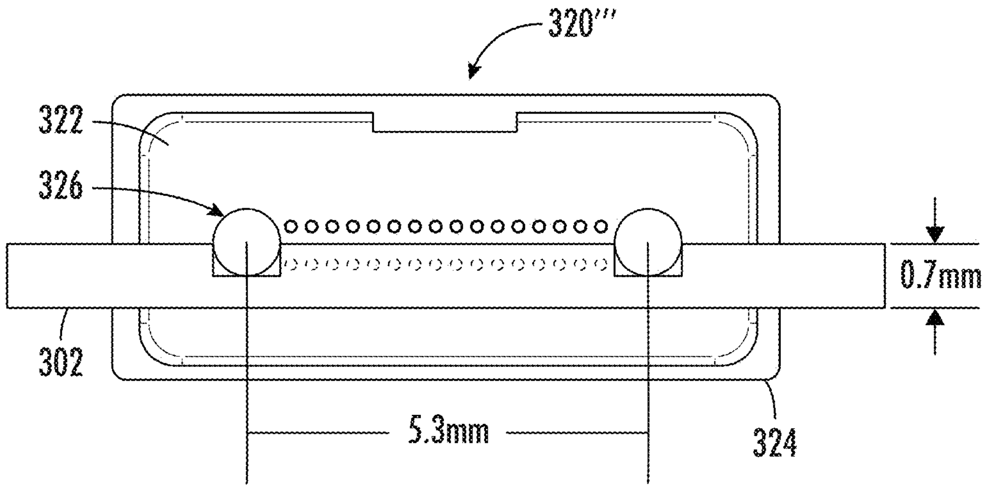
FIG. 3D is an end elevational view of a ferrule portion of a multi-fiber optical plug and a substrate, in accordance with some embodiments discussed herein.

FIG. 3D is a schematic view illustrating a ferrule 320'" with a substrate 302 positioned against the ferrule 320'". The substrate 302 may have a height of approximately 0.7 mm. The substrate 302 may be configured to receive and removably or permanently connect the guide pins, and these guide pins may be received within alignment holes 326.

Figure 4A:
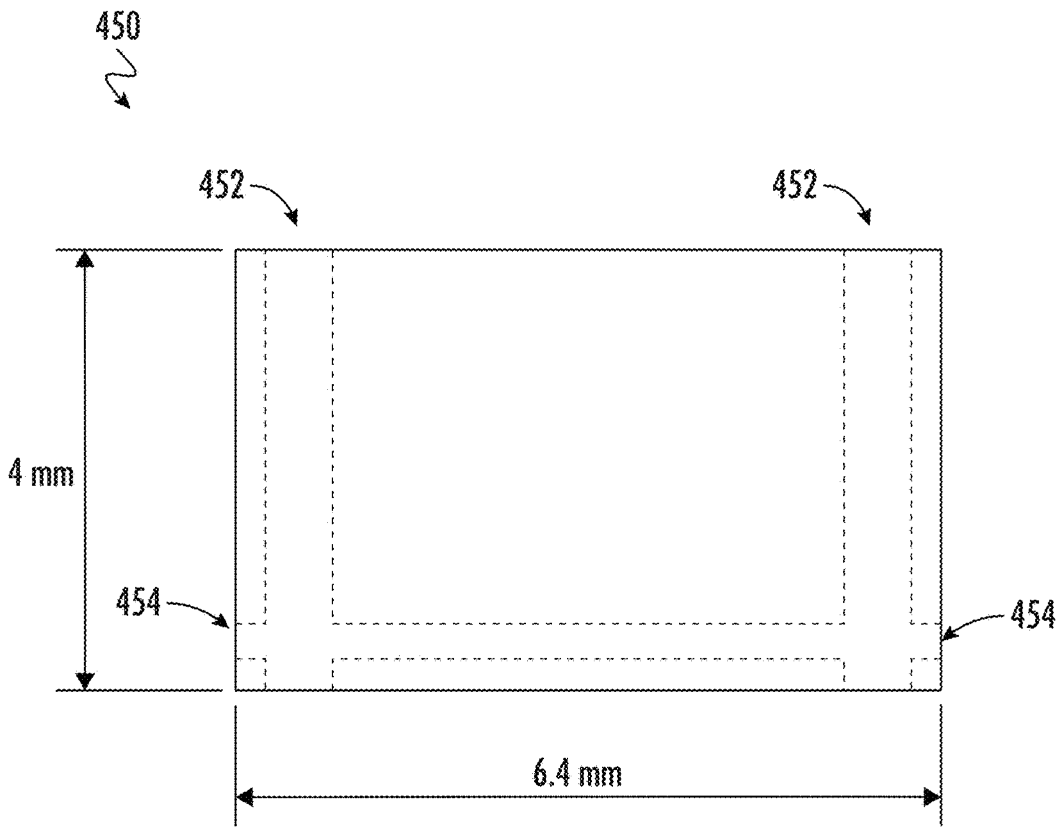
FIG. 4A is a bottom schematic view of a cover that may be used in conjunction with the receiving features of the substrate to removably or permanently connect one or more guide pins, in accordance with some embodiments discussed herein.
Figure 4B:
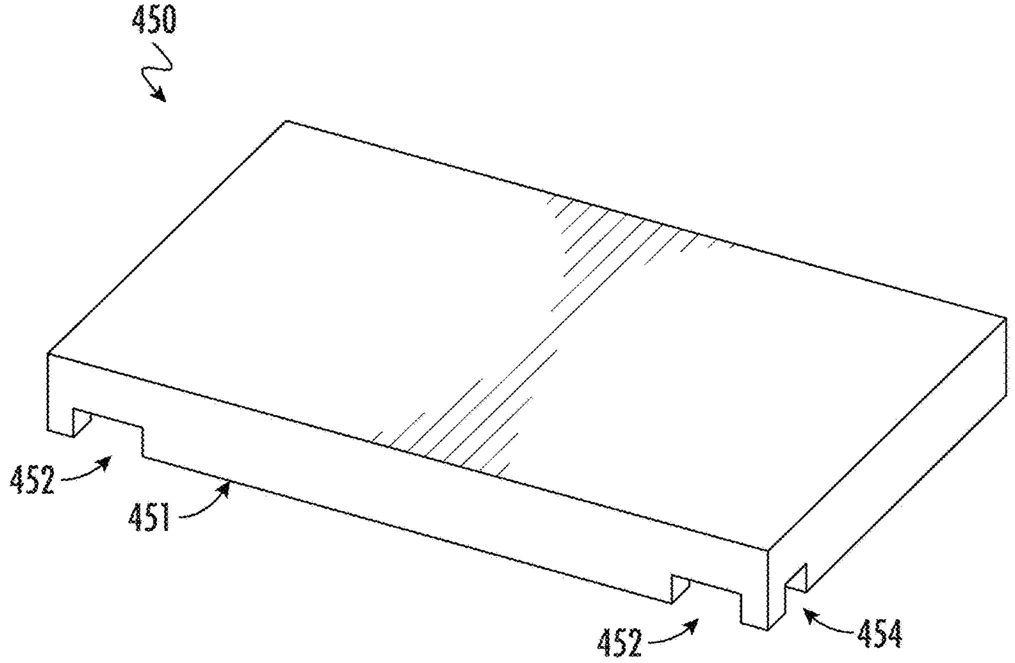
FIG. 4B is a perspective view of the cover illustrated in FIG. 4A, in accordance with some embodiments discussed herein.
Figure 4C:
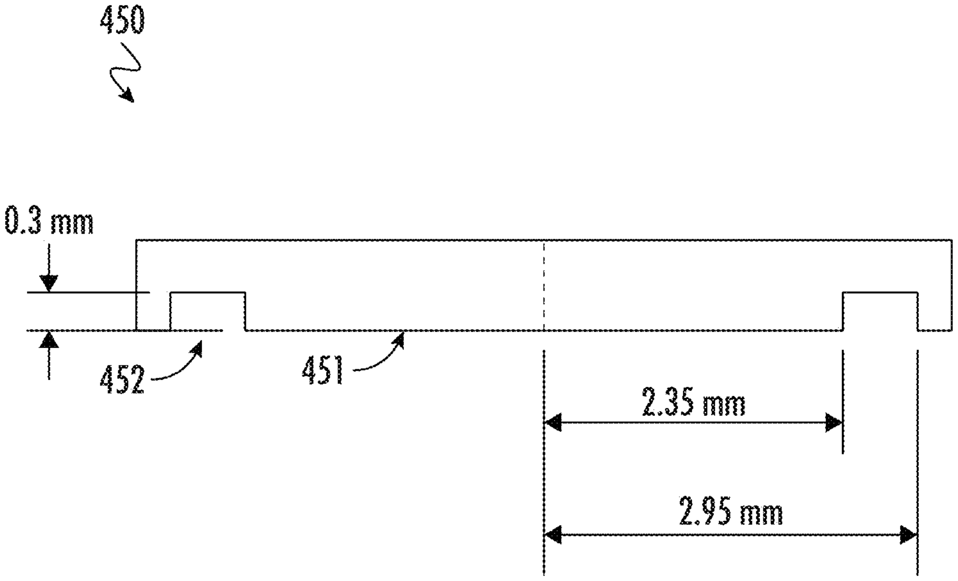
FIG. 4C is a front view of the cover illustrated in FIG. 4A, in accordance with some embodiments discussed herein.
Figure 4D:
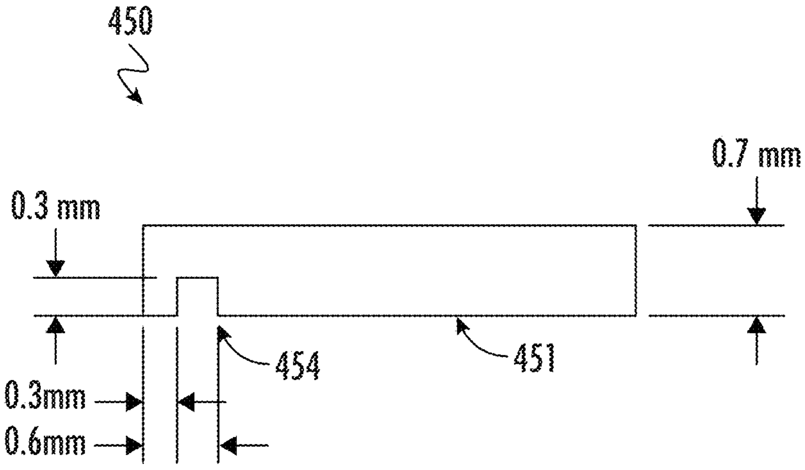
FIG. 4D is a side view of the cover illustrated in FIG. 4A, in accordance with some embodiments discussed herein.

To assist with removably or permanently connecting a guide pin to the appropriate position on a substrate or a substrate body of the substrate, a cover may be provided that may be positioned above the guide pin(s). FIGS. 4A-4D illustrate various views of a cover 450 that may be used. FIG. 4A is a bottom schematic view of a cover 450 that may be used in conjunction with the receiving features 148 (FIG. 1A), 208 (FIG. 2A, 2B) of the substrate 140, 200 to removably or permanently connect two guide pins. FIG. 4B is a perspective view of the cover 450, FIG. 4C is a front view of the cover 450, and FIG. 4D is a side view of the cover 450.

The cover 450 may be designed to press and hold guide pins 154 (FIG. 1B) or 212 (FIGS. 2A-2B) in the appropriate position. The cover 450 may comprise plastic or glass material. In some embodiments, a cover 450 and a substrate body 202 (FIGS. 2A-2B) of a substrate 200 (FIGS. 2A-2B) are made of materials having a similar coefficient of thermal expansion (CTE), but the cover 450 and a substrate body 202 may have dissimilar CTE properties in other embodiments. In some instances, the cover 450 and the substrate body 202 (FIGS. 2A-2B) are made of the same material and have the same CTE. Where a CTE mismatch is present, some components may tend to expand or shrink in size disproportionally in very warm or very cold temperatures, which may lead to misalignment of the components. By providing a cover 450 and a substrate body 202 (FIGS. 2A-2B) with similar or the exact same CTE, the reliability of the assembly as a whole may be improved.

In some embodiments, an adhesive may be used to permanently connect the cover 450, the guide pins 212 (FIGS. 2A-2B), and/or the substrate body 202 (FIGS. 2A-2B) of the substrate 200 (FIGS. 2A-2B) together. This adhesive may comprise a material having a CTE that differs from the CTE for materials provided in the cover 450, the guide pins 212 (FIGS. 2A-2B), and the substrate body 202 of the substrate. Thus, in some embodiments, only a small amount of adhesive is used. For example, an adhesive layer may be provided having a thickness of less than 100 μm. By using only a small amount of adhesive, the reliability of the assemblies may be improved. A CTE mismatch may be less relevant, for example, where the assembly is only used indoors. However, in some embodiments, no adhesive is used.

The cover 450 may be approximately 6.4 mm in width (measured from left to right in FIG. 4A). The cover 450 may also be 4 mm in length (measured from bottom to top in FIG. 4A). The cover 450 may comprise two primary cover trenches 452. These primary cover trenches 452 may be formed on a bottom surface 451 of the cover 450, and these primary cover trenches 452 may span along the length of the cover 450. As illustrated in FIG. 4A, the primary cover trenches 452 may span the entire length of the cover 450. However, in other embodiments, the primary cover trenches 452 may extend only partially into the cover 450.

As illustrated in FIG. 4C, primary cover trenches 452 may be approximately 0.6 mm in width (measured from left to right in FIG. 4C) and may be approximately 0.3 mm in depth (measured from bottom to top in FIG. 4C). The primary cover trenches 452 may have two side edges, and the side edge positioned closer to the center of the cover 450 may be positioned approximately 2.35 mm away from the center of the cover 450 in some embodiments.

As illustrated in FIG. 4D, secondary cover trenches 454 may be provided at the bottom surface 451 of the cover 450. Secondary cover trenches 454 may have two side edges. The side edge positioned farther away from the center of the cover 450 may be approximately 0.3 mm away from a side surface of the cover 450. The secondary cover trench 454 may be approximately 0.3 mm in width (measured from left to right in FIG. 4D). The secondary cover trenches 454 may also have a depth (measured from bottom to top in FIG. 4D) of approximately 0.3 mm.

While specific dimensions are described above, a cover 450 may be provided with different dimensions in other embodiments. These dimensions may be provided to meet the overall packaging specifications required for a given application. In some embodiments, primary cover trenches 452 and secondary cover trenches 454 may be formed on a top surface of the cover 450 rather than on the bottom surface 451.

Figure 5A:
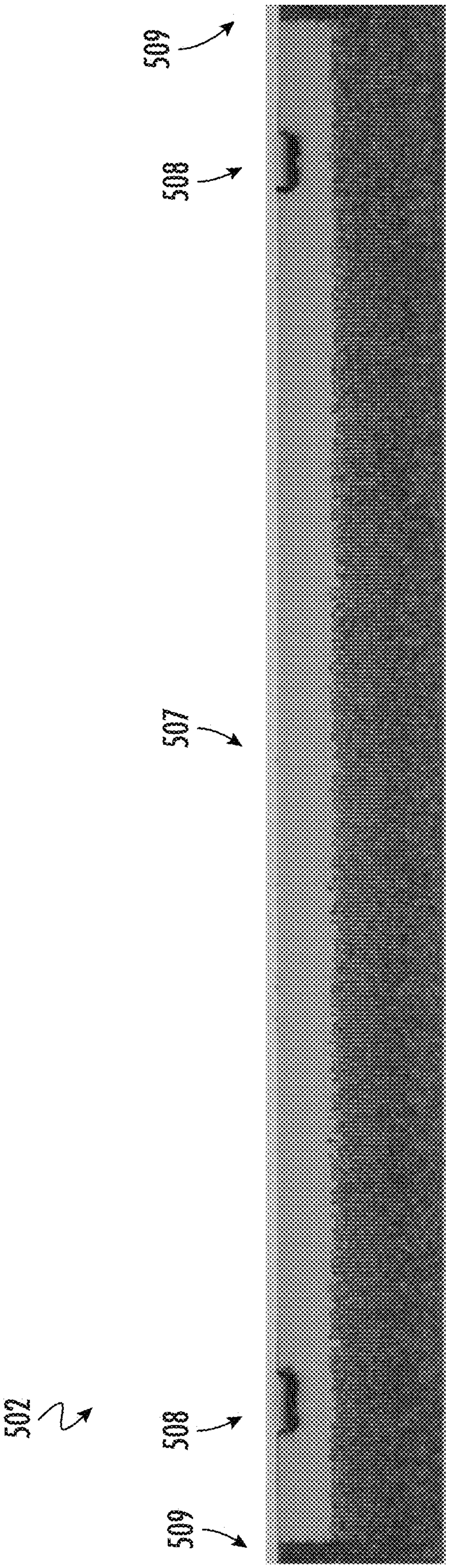
FIG. 5A is a side view of an example substrate end-face, in accordance with some embodiments discussed herein.

In some embodiments, the substrate may comprise an optical area, and this optical area may be configured to receive and hold waveguides. Controlling the dimensions of this optical area relative to a ferrule and controlling the transition from the optical area may be important considerations. FIG. 5A is a side view of a substrate 502 where an optical area 507 may be seen. As illustrated, the substrate 502 comprises two receiving features 508. In this embodiment, the receiving features 508 are provided as trenches. The trenches are approximately 249.8 μm in width. FIG. 5A also illustrates an optical area 507 and two non-optical areas 509. A ferrule (e.g. ferrule 320 in FIG. 3A) may be urged against the substrate 502 at the optical area 507. The optical area 507 width (measured from left to right in FIG. 5A) may be greater than the width of the ferrule so that the ferrule may be provided entirely within the optical area. In some embodiments, the width of the ferrule may be approximately 6.5 mm, so the width of the optical area 507 may be greater than 6.5 mm. The optical area 507 may be partially nano-perforated, and other non-optical areas 509 may be fully nano-perforated during the substrate laser singulation process.

Figure 5B:
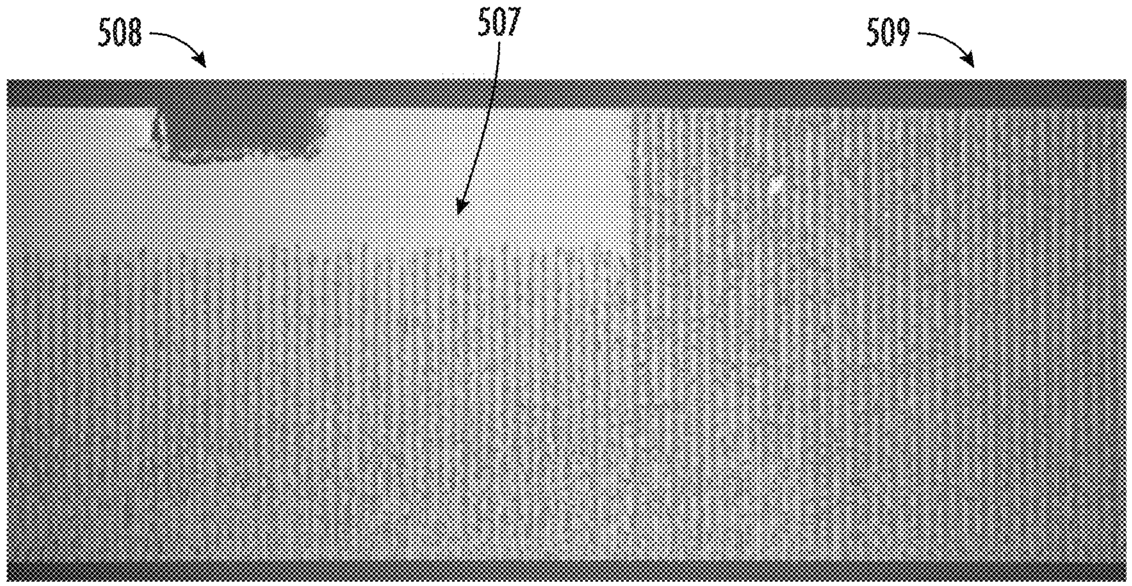
FIG. 5B is a close-up side view of a portion of an example substrate end-face, in accordance with some embodiments discussed herein.
Figure 5C:
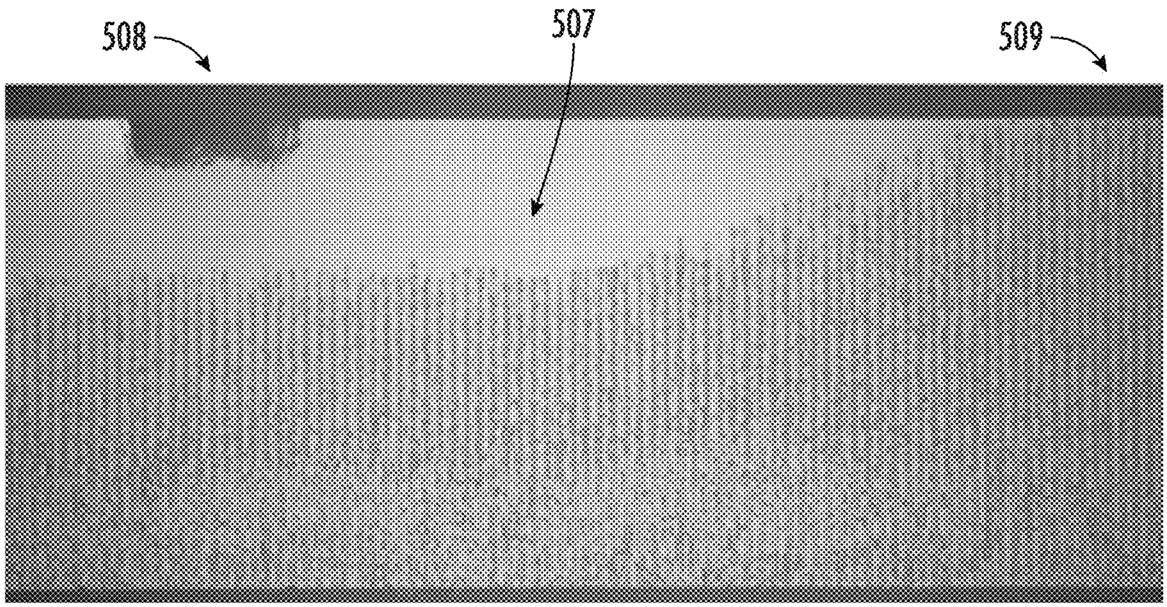
FIG. 5C is a close-up side view of a portion of another example substrate end-face, in accordance with some embodiments discussed herein.

FIGS. 5B and 5C illustrate different approaches for transitioning from partial nano-perforation in an optical area 507 to full nano-perforation in non-optical areas 509. In FIG. 5B, this change occurs as a step function, where the transition occurs immediately and is not spread out from left to right. In FIG. 5C, this change occurs adiabatically so that the transition is spread out from left to right. The change from full-nano-perforation in the non-optical area 509 to partial nano-perforation in the optical area 507 can be achieved by stepping the laser focus or adiabatic change of laser focus.

By providing an optical area 507 that is wider than the ferrule width, any change from partial nano-perforation to full perforation will occur outside of any overlap area between a ferrule and an optical area. This reduces the risk of protruded features which could prevent physical contact between optical fibers and the waveguides. This may also be beneficial to reduce waviness of waveguides and to reduce the number of defects.

An adapter may be provided that enables a precise connection with both a substrate and a plug. The adapter may allow for precise alignment of waveguides within the substrate and optical fibers within the plug. The adapter may permit passive alignment to be performed, enabling greater cost savings and a greater yield. Further, the adapter may allow for fibers to be connected with a high density.

Figure 6A:
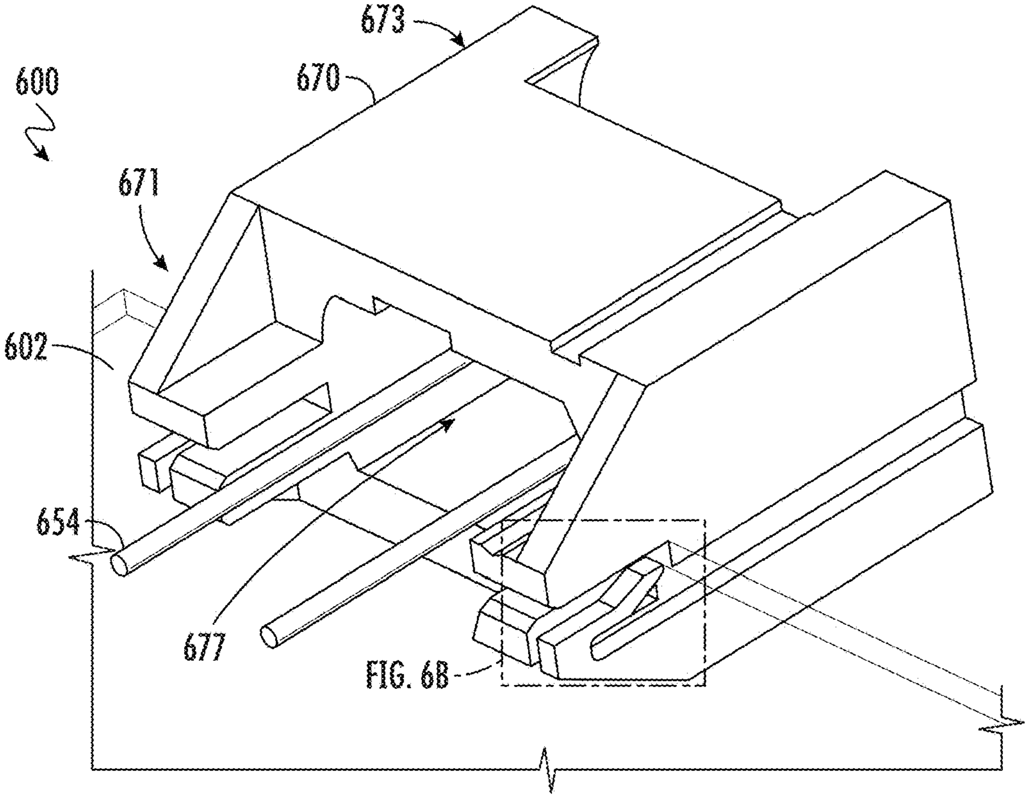
FIG. 6A is a perspective view of certain components of a system for aligning a substrate, where an adapter is removably or permanently connected to the substrate, in accordance with some embodiments discussed herein.

These features and other features of various embodiments are more readily understood in reference to, for example, FIGS. 6A-6G and 7A-7C. As illustrated in FIG. 6A, a substrate 600 is provided. This substrate 600 may comprise a substrate body 602 having a receiving feature 148 (shown in FIG. 1A). The substrate 600 may comprise one or more waveguides. At least one guide pin 654 is also provided, and these guide pins 654 comprise a first end and a second end. The receiving feature may be configured to receive and removably or permanently connect the first end of the guide pin 654. The first end of the guide pin 654 may be removably or permanently connected to the substrate 644 using a cover 650 (shown in FIG. 6F). The second end of the guide pins 654 may extend outwardly from the substrate body 602.

Figure 6B:
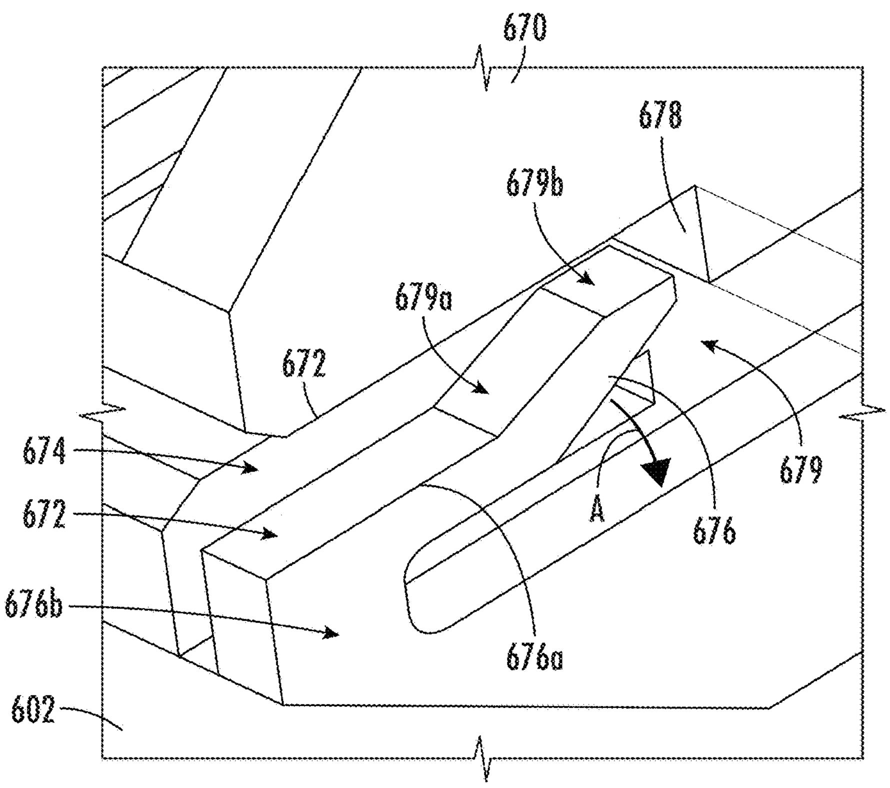
FIG. 6B is a close-up view of the components illustrated in FIG. 6A, in accordance with some embodiments discussed herein.
Figure 6C:
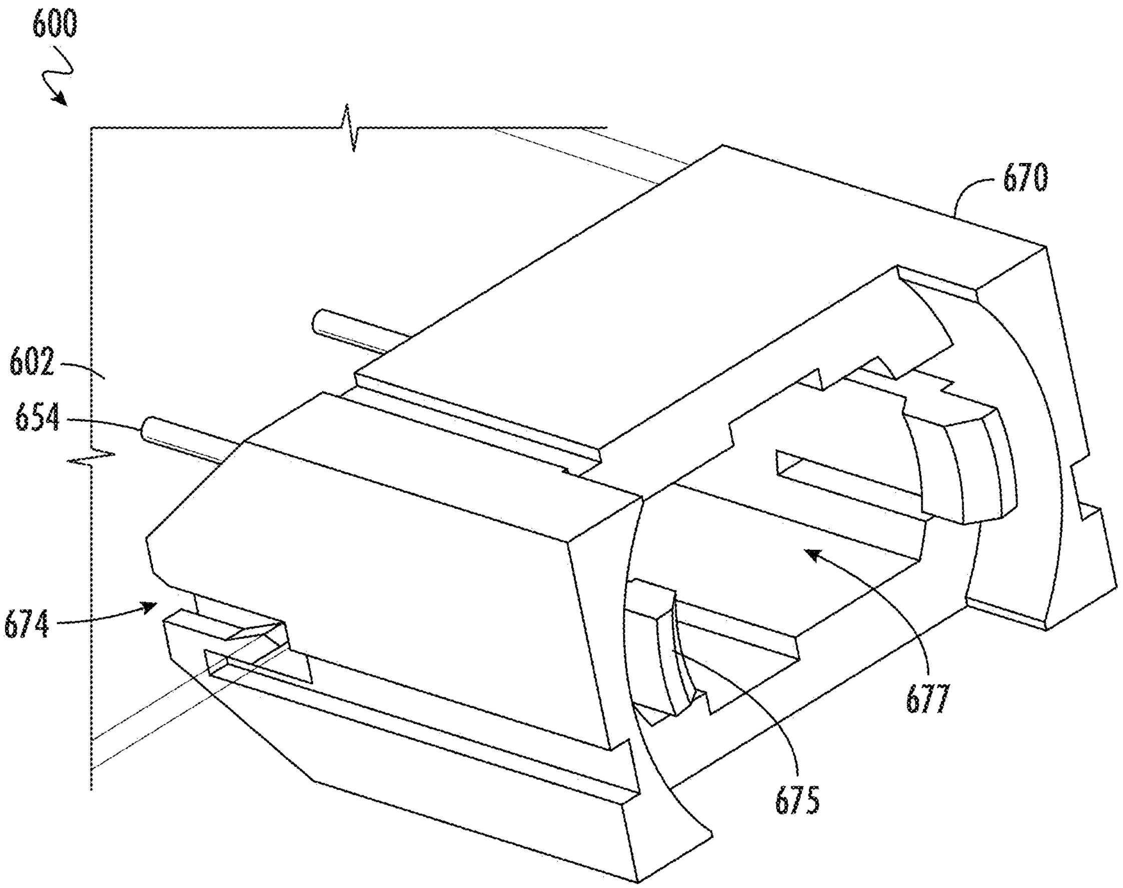
FIG. 6C is another perspective view of the components illustrated in FIG. 6A, in accordance with some embodiments discussed herein.

FIGS. 6A-6C illustrate an adapter 670 that is removably or permanently connected to the substrate body 602 of the substrate 600. The adapter 670 may comprise a pair of opposing walls 672, and these opposing walls 672 may define a spacing 674 between the pair of opposing walls 672 (shown in FIG. 6B). A spacing size of the spacing 674 may correspond to a thickness of the substrate body 602. The adapter 670 may be configured to receive and removably or permanently connect the substrate body 602 in the spacing 674 between the pair of opposing walls 672. The spacing size of the spacing 674 may correspond to the thickness of the substrate body 602 by being correlated with each other, by having a linear relationship with each other, or by being approximately equal. In some embodiments, adhesive may be used to permanently connect the substrate body 602 of the substrate 600 with the adapter (e.g., between the pair of opposing walls 672). In some embodiments, however, no adhesive may be used.

In some embodiments, the adapter 670 may comprise a clip 676. This clip 676 may comprise a first section 679 extending into the spacing 674. The first section 679 may define a taper 679*a* that extends downwardly from a top engagement portion 679*b*. Further, the clip 676 may define an arm section 676*a* that extends from a clip body section 676*b* leading to the first section 679. The arm section 676*a* may be rigid or may otherwise bias the first section 679 to a first position (such as shown in FIG. 6B). However, the arm section 676*a* may enable retraction of the first section 679 out of the spacing 674 (e.g., along arrow A) such as to a second position that allows insertion of the substrate body 602 therepast.

Accordingly, as the adapter 670 is pushed onto the substrate body 602, the taper 679*a* of the clip 676 causes the first section 679 of the clip 676 to retract and enable further insertion of the substrate body 602 until the substrate body 602 runs up against the back wall 678. Notably, the bias of the clip 676 causes the first section 679 to provide a force upwardly against the substrate body 602 (which is pushed up against the top wall of the pair of opposing walls 672). In such a regard, the clip 676 applies a force that aids in removable or permanent connection of the adapter 670 to the substrate body 602. The first section 679 of the clip 676 may be configured to shift depending on the amount of force applied to the first section, and, therefore, the size of the spacing 674 may vary depending on the position of the first section 679 of the clip 676.

In this regard, in some embodiments, the clip 676 may be configured to restrain movement of the optical fibers (e.g. 868 of FIG. 8) relative to the substrate 600 when the clip is engaged with the substrate body 602.

Figure 10:
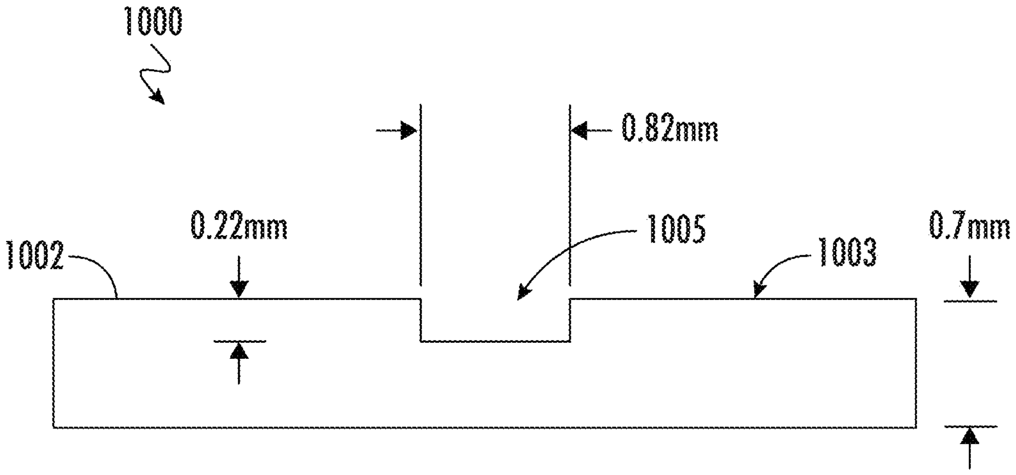
FIG. 10 is a schematic view of an alignment feature within a substrate, in accordance with some embodiments discussed herein.

In some embodiments, with reference to FIG. 10, an alignment feature 1005 may be laterally positioned on the substrate body 602 of the substrate 600 to provide for passive alignment of the adapter 670 for properly aligning the optical fibers of a plug 690 with the waveguides on/in the substrate 600. In this regard, the adapter 670 may include an adapter alignment feature (e.g., a protrusion) that fits with the alignment feature 1005, which may, for example, form a trench. Accordingly, alignment of the adapter alignment feature of the adapter 670 with the alignment feature 1005 on the substrate body 602 may enable passive alignment of the adapter onto the substrate (which will align the optical fibers of the plug when the plug is removably connected to the adapter). Further detail regarding an example alignment feature is described with respect to FIG. 10.

Figure 6D:
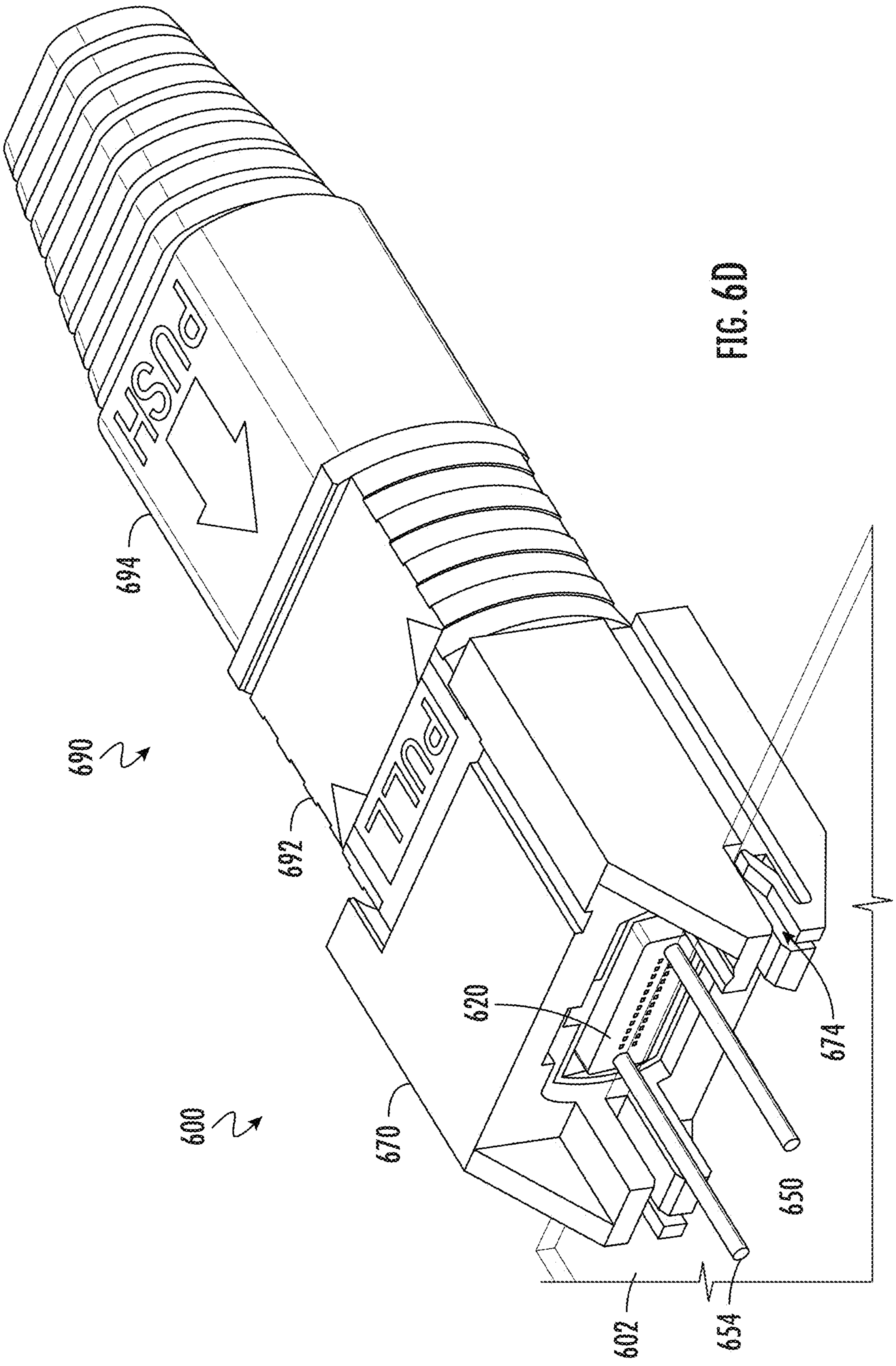
FIG. 6D is a perspective view of the components illustrated in FIG. 6A along with a plug removably connected to the adapter, in accordance with some embodiments discussed herein.

The adapter 670 and a plug 690 may be configured to be removably connected together. As illustrated in FIG. 6A and 6C, the adapter 670 may define a void 677. As illustrated in FIG. 6D, this void 677 may be configured to receive a ferrule 620 when the plug 690 and the adapter 670 are removably connected together. This void 677 may be positioned and otherwise configured to permit the ferrule 620 to abut the substrate 600. Further, in FIG. 6C, a snap feature 675 is provided within the void 677. This snap feature 675 may be configured to engage with a ferrule 620 or some portion of the plug 690 to restrain movement of the plug 690 relative to the adapter 670. The snap feature 675 may possess a different geometry in other embodiments. Notably, removable or permanent connection of the adapter 670 and the substrate body 602 and removable connection of the adapter 670 and the plug 690 restrain movement of the optical fibers (e.g. 868 of FIG. 8) relative to the substrate 600.

Figure 6E:
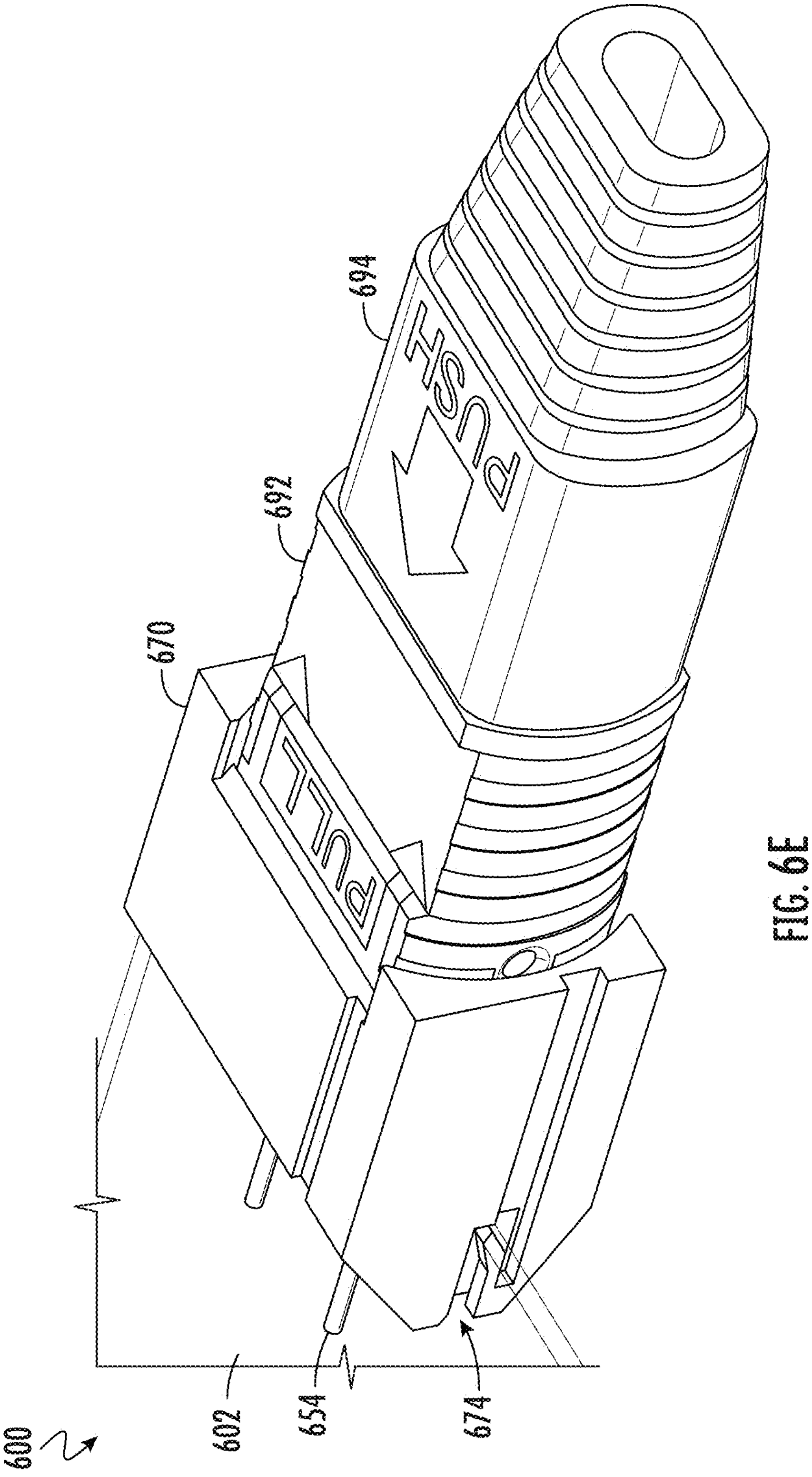
FIG. 6E is another perspective view of the components illustrated in FIG. 6D, in accordance with some embodiments discussed herein.

FIGS. 6D and 6E illustrate components of a system when the adapter 670 is removably or permanently connected to the substrate body 602 of the substrate 600 and when the adapter 670 is also removably connected to the plug 690. As illustrated, when the system is in this state, the ferrule 620 may be urged towards to the substrate body 602 of the substrate 600. In some embodiments, the ferrule 620 may be urged up against the substrate body 602, but a gap may be maintained in some embodiments. The plug 690 may comprise one or more sections. In the illustrated embodiment, a first section 692 and a second section 694 are provided. The plug 690 may define an internal recess, and the plug may be configured to receive and removably or permanently connect optical fibers (e.g. 868 of FIG. 8) within the internal recess. The plug 690 may be a Multi-fiber Push-on (MPO) connector, according to IEC 61754-7.

The plug 690 may also define at least one guide pin hole (e.g. 725 of FIG. 7C) that is configured to receive the second end of a guide pin 654. The guide pin holes 725 may be defined within an internal surface in the plug 690. In some embodiments, the plug 690 may comprise a ferrule 620, and the guide pin holes 725 may be defined within the ferrule 620. The second end for the guide pins 654 may be configured to engage with the guide pin holes 725 to align the optical fibers (e.g. 868 of FIG. 8) of the plug 690 with the one or more waveguides in the substrate 600.

In some embodiments, the adapter 670 may comprise a first side 671 and a second side 673. The second side 673 may be opposite to the first side 671. The adapter 670 may be configured to receive the substrate 600 or the substrate body 602 thereof at the first side 671, and the adapter may be configured to removably connect the plug 690 at the second side 673.

Figure 6F:
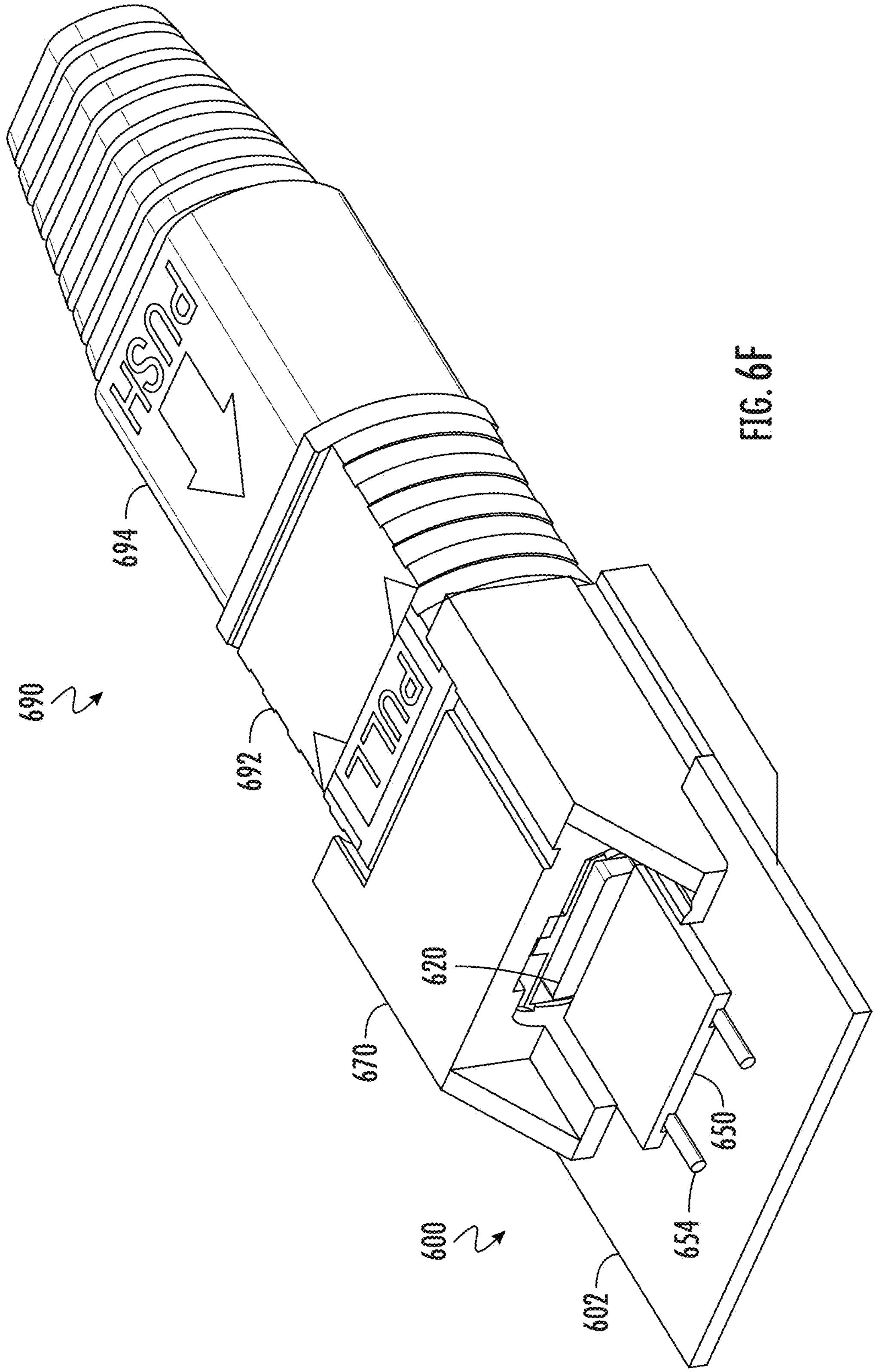
FIG. 6F is a perspective view of the components illustrated in FIG. 6D where a cover for guide pins of the substrate is shown, in accordance with some embodiments discussed herein.
Figure 6G:
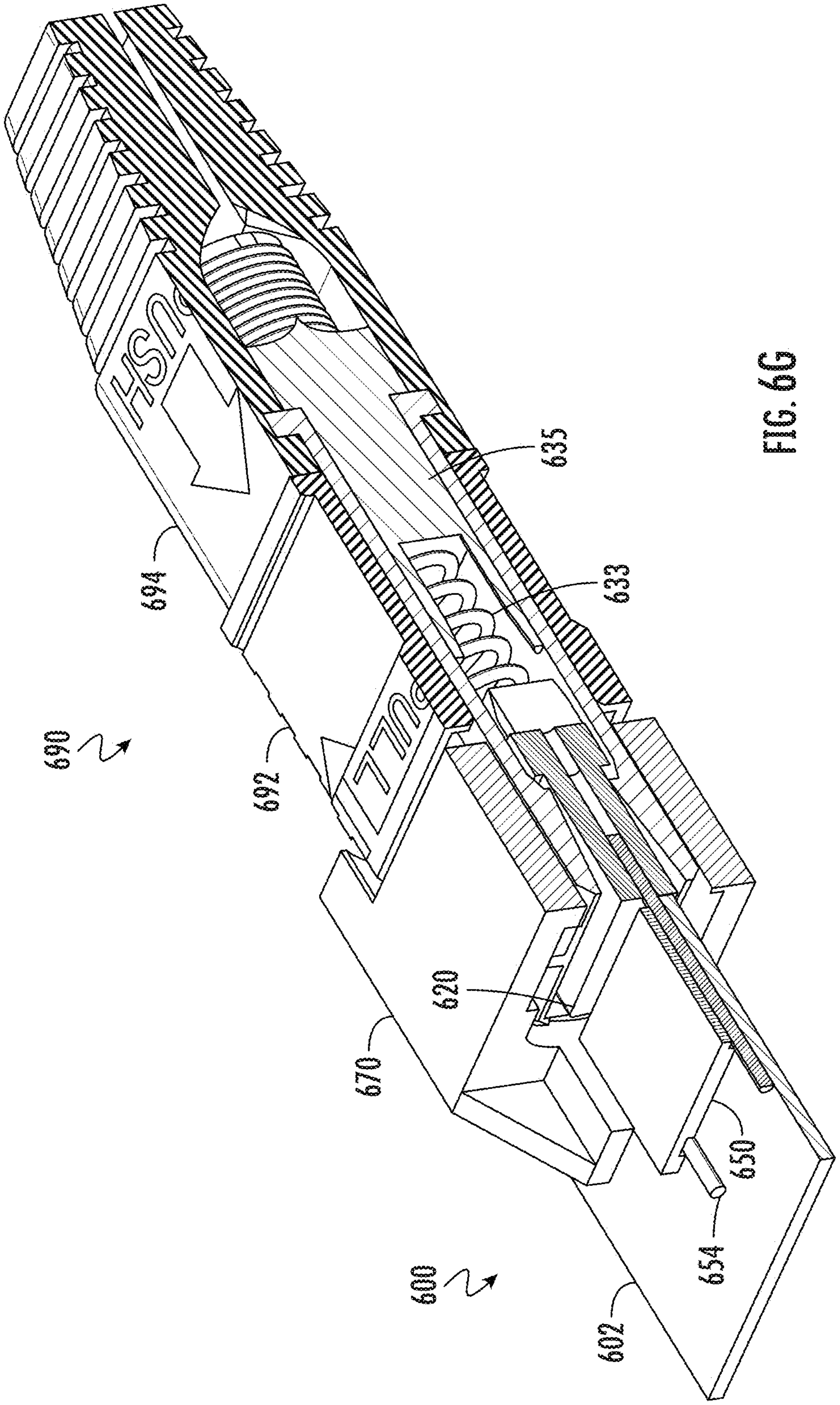
FIG. 6G is a cross sectional view of the components illustrated in FIG. 6F, in accordance with some embodiments discussed herein.

To provide clarity, no cover 650 is illustrated in FIGS. 6D and 6E. However, a cover 650 may be provided as illustrated in, for example, FIGS. 1B, 6F, and 7A. FIG. 6F and FIG. 6G are various views of certain components illustrated in FIG. 6D where a cover 650 is shown. FIG. 6F is a perspective view while FIG. 6G is a cross sectional view. The cross sectional view illustrated in FIG. 6G allows the internal portions of the plug 690 to be more readily seen. As illustrated, a spring 633 may be provided. The ferrule 620 is positioned between the spring 633 and the substrate 600, and the ferrule 620 is configured to receive the one or more optical fibers and the at least one guide pin 654. When the guide pin(s) 654 are shifted towards the plug 690 and the ferrule 620, the spring 633 may be configured to generate a force against the ferrule 620 and urge the ferrule 620 towards the substrate 600. In some embodiments, the ferrule 620 is a Mechanical Transfer (MT) ferrule. In some embodiments, the spring 633 is configured to urge the ferrule 620 against the substrate body 602 of the substrate 600. In certain embodiments, the spring 633 is configured to urge the ferrule 620 proximate to the substrate 600 while leaving a gap between the end-face of the one or more optical fibers and the one or more optical waveguides of the substrate. An anti-reflection coating or an index matching material may be deposited in the gap and against the end-face of the one or more optical fibers. This may be beneficial to maintain desirable properties (e.g., low back reflection, low insertion loss) for the connection while reducing the amount of force generated by a spring 633 against the substrate body 602 of the substrate 600. In some embodiments, the force generated by the spring 633 is between 1 N and 25 N and the anti-reflection coating or the index matching material contacts the one or more optical fibers (e.g. 868 of FIG. 8) and the one or more waveguides. In some embodiments, the spring may only provide between 1 N and 15 N in force, and in other embodiments, the spring may only provide between 1 N and 5 N in force.

Figure 7A:
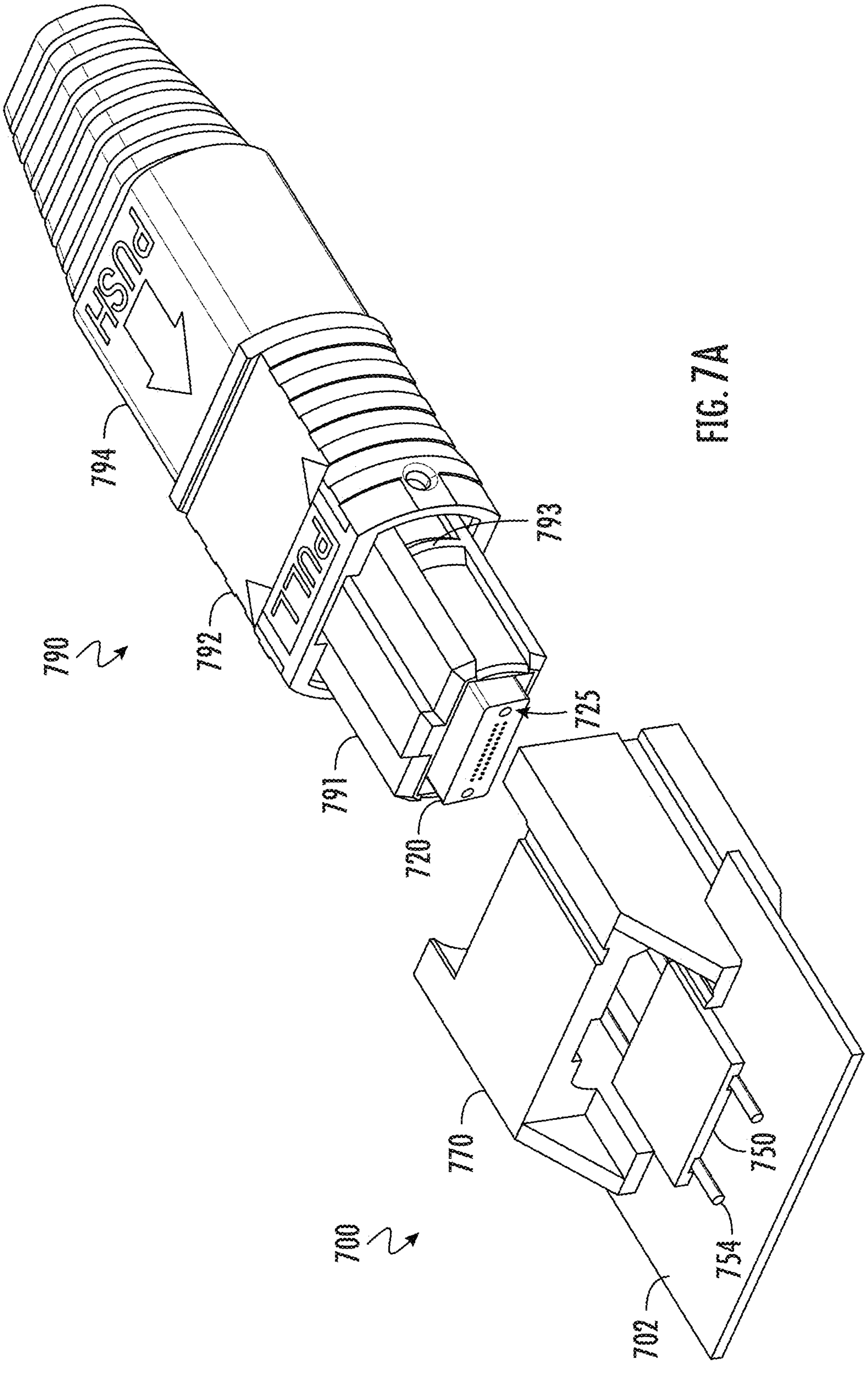
FIG. 7A is a perspective view of the components illustrated in FIG. 6F, where the adapter is removably or permanently connected to the substrate and the adapter and the plug are separated, in accordance with some embodiments discussed herein.
Figure 7B:
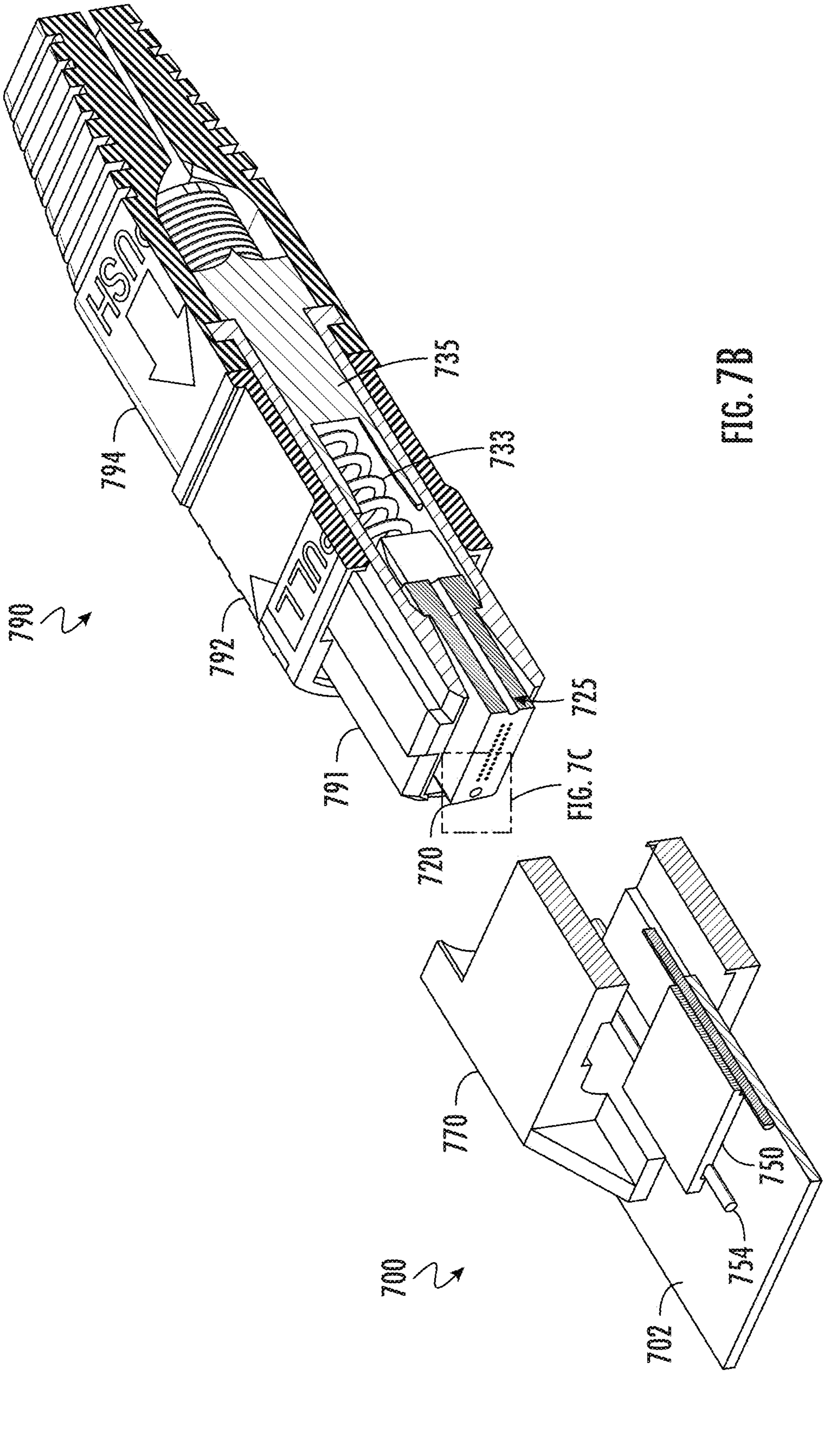
FIG. 7B is a cross sectional view of the components illustrated in FIG. 7A, in accordance with some embodiments discussed herein.

FIGS. 7A and 7B illustrate components of an example system when the adapter and the plug are disengaged from each other. FIG. 7B illustrates a cross-sectional view allowing the internal portions of the plug to be seen. FIGS. 7A and 7B include several components similar to those presented in FIGS. 6A and 6B. For example, guide pins 754 may be removably or permanently connected to a substrate body 702 of a substrate 700, and a cover 750 may assist in removably or permanently connecting the guide pins 754. Adhesive may also be used to assist in permanently connecting the guide pins 754. The substrate body 702 may be received within a spacing defined by the adapter 770, and the adapter 770 may be configured to removably or permanently connect the substrate body 702.

As illustrated in FIG. 7A, a plug 790 may be provided having a first section 792 and a second section 794. Additionally, a ferrule 720 may be provided within an internal recess of the plug 790. This ferrule 720 may comprise one or more guide holes 725, and these guide holes 725 may be configured to receive and removably or permanently connect the guide pins 754. The plug 790 may also comprise a male portion 791. This male portion 791 may be configured so that it may be received within the void 677 (e.g. FIG. 6A). The male portion 791 may possess a shape that generally matches the shape of the void 677, and the two may be similar in size so that the male portion 791 fits tightly within the void 677. The male portion 791 may define contours around its perimeter, and these contours may further assist in restraining the movement of the plug 790 relative to the adapter 770. The male portion 791 may also comprise an extension 793, and this extension 793 may be configured to engage with the snap feature (e.g., the snap feature 675 shown in FIG. 6C) to assist in removably connecting the plug 790 and the adapter 770 together.

Figure 7C:
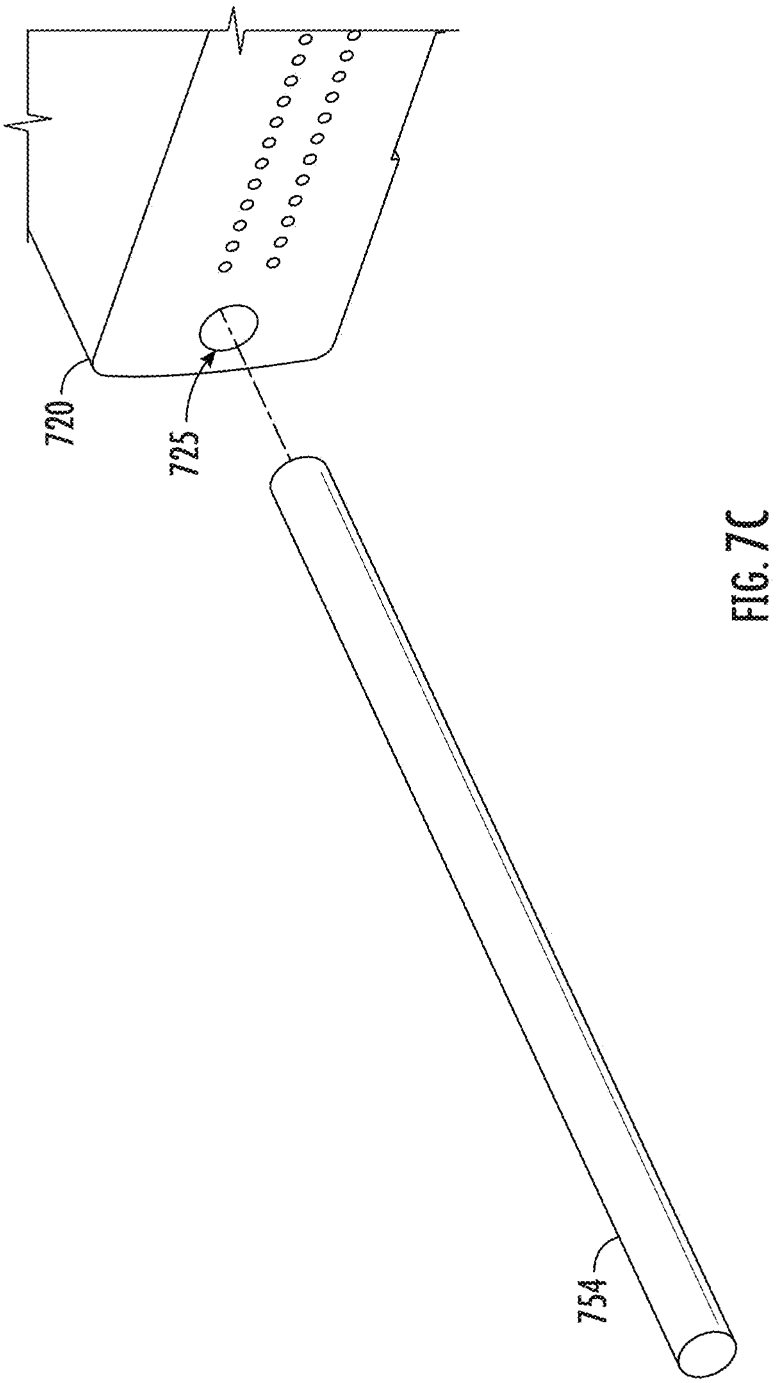
FIG. 7C is a close-up view of a portion of the ferrule and guide pin illustrated within FIG. 7B, in accordance with some embodiments discussed herein.

FIG. 7C illustrates a close-up view of the ferrule 720 where a guide hole 725 within the ferrule 720 may be seen. As illustrated, a guide pin 754 may be configured to be received within the guide hole 725. Once the guide pin 754 is received within the guide hole 725, this engagement may assist in aligning the optical fibers (e.g., 868 of FIG. 8) of the plug 790 (FIG. 7A) with waveguides within the substrate 700.

Figure 8:
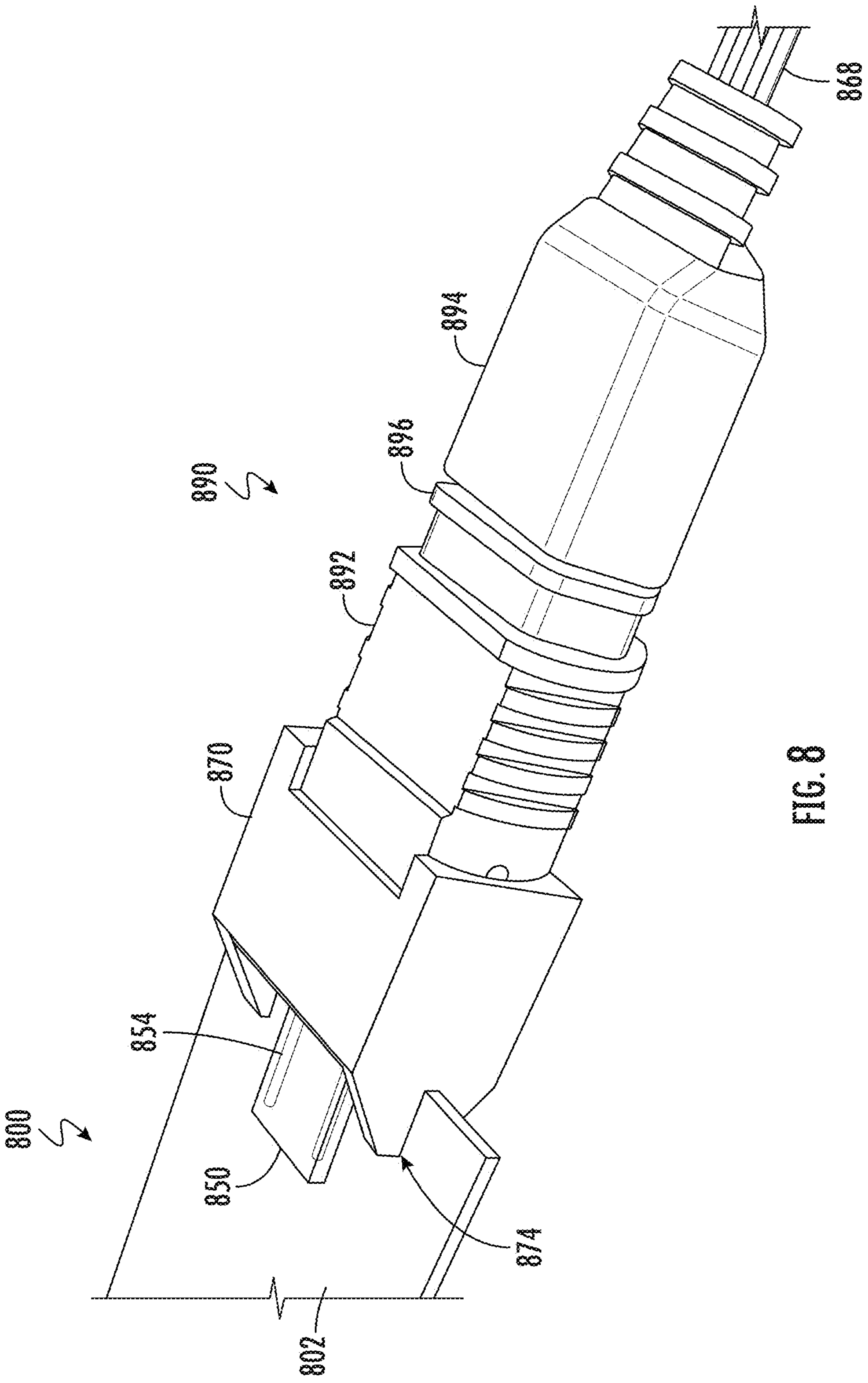
FIG. 8 is a perspective view of another example system including a substrate, adapter, and plug, in accordance with some embodiments discussed herein.

FIG. 8 is a perspective view of another example system for aligning optical fibers with waveguides of a substrate. In this embodiment, a plug 890 having a first section 892, a second section 894, and a third section 896 is used. In this embodiment, a two-row MTP®-16 ferrule may be used alongside a 9.8 N spring and sixteen optical fibers. In some embodiments, multiple plugs 890 may be provided along the edge of the substrate body 802, and this may be advantageous for racks or data centers. Some embodiments may enable sixteen plugs 890 to be removably connected to a substrate body 802, but more plugs 890 may be used depending on the size and geometry of the substrate body 802.

Figure 9A:
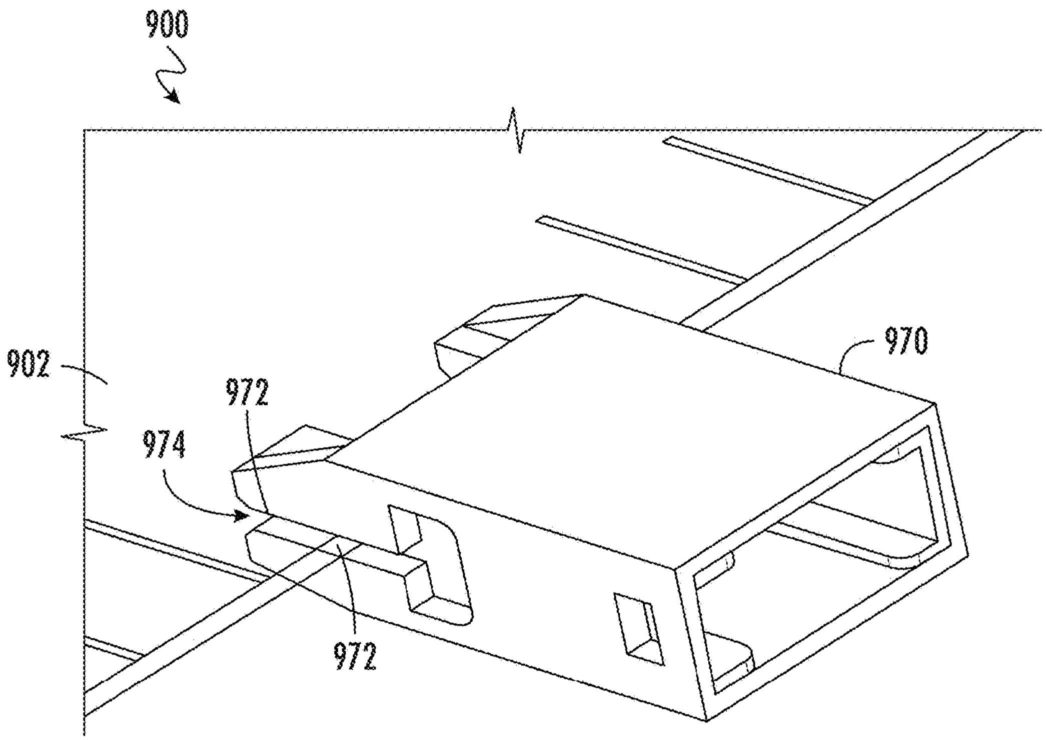
FIG. 9A is a perspective view of another example substrate and adapter, in accordance with some embodiments discussed herein.
Figure 9B:
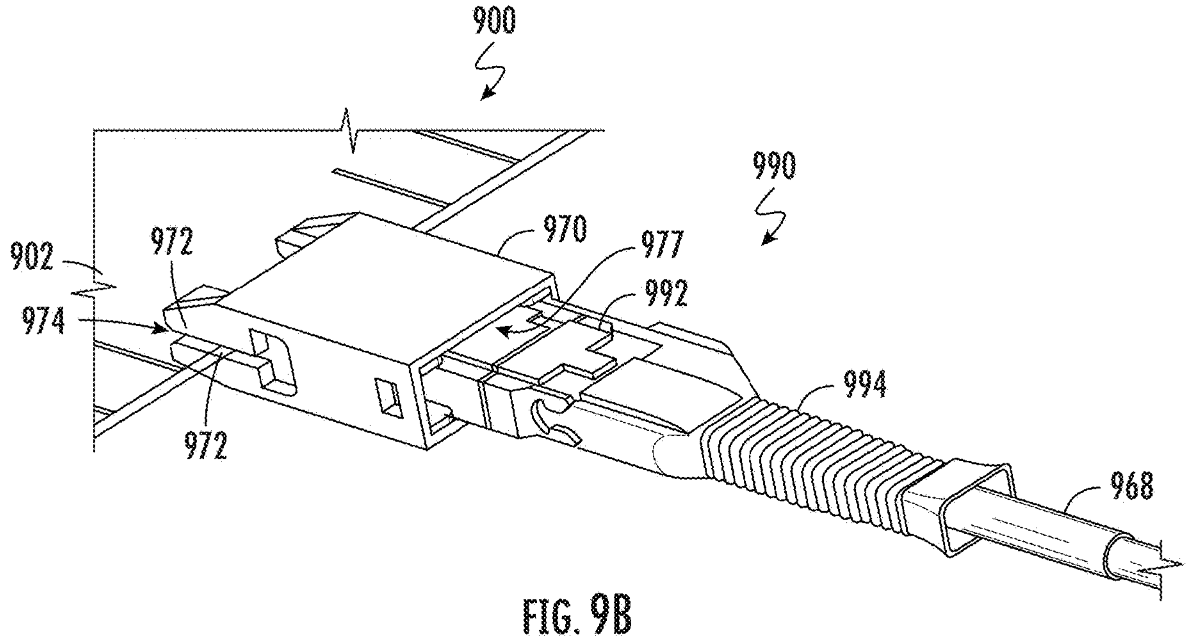
FIG. 9B is a perspective view of the components illustrated in FIG. 9A along with a plug that is removably connected to the adapter, in accordance with some embodiments discussed herein.

In some embodiments, very-small form factor (VSFF) connectors, such as MDC connectors (sometimes referred to as "mini duplex connectors") offered by U.S. Conec, Ltd. (Hickory, NC), and SN connectors (sometimes referred to as a Senko Next-generation connectors) offered by Senko Advanced Components, Inc. (Marlborough, MA) may be used. FIGS. 9A and 9B illustrate an adapter 970 that may be used with such a VSFF connector, particularly an MDC connector, e.g. plug 990. FIG. 9A is a perspective view of another example adapter 970, with the adapter 970 being removably or permanently connected to the substrate 900, and FIG. 9B is a perspective view of the components illustrated in FIG. 9A, where the plug 990 is shown and is removably connected to the adapter 970. As shown, a substrate 900 may be provided having a substrate body 902. This substrate 900 may comprise other features of similar substrates described in conjunction with other figures. For example, the substrate 900 may comprise at least one guide pin, one or more waveguides, and a receiving feature within the substrate body where the guide pin may be received and removably or permanently connected. The adapter 970 may have a smaller height and width, and this may lead to increased fiber density. The fiber density may be increased, for example, by reducing the size of the ferrule to 5 mm in width and/or increasing the number of fibers received in each plug (24 or 32 fibers may be used rather than 16). The fiber density may also be increased by reducing the fiber cladding diameter, for example, from 125 μm to 80 μm and/or by using multi-core fibers with two or more cores.

The adapter 970 may comprise a pair of opposing walls 972, and the opposing walls 972 may define a spacing 974 between the walls. The spacing size of the spacing may correspond to the thickness of the substrate body 902. The adapter 970 may also define a void 977 where the plug 990 may be received. This void 977 may possess a geometry that allows the plug 990 to fit tightly within the void 977. Additionally, one or more connection features may be used to removably connect the plug 990 into the adapter 970. The plug 990 may comprise one or more sections. In this embodiment, the plug 990 comprises a first section 992 and a second section 994. However, a different number of sections may be used in other embodiments. As illustrated in FIG. 9B, one or more optical fibers 968 may be received within the plug 990, and the optical fibers 968 may extend through the plug 990 all the way to a ferrule within the plug 990.

FIG. 10 is a schematic view of an alignment feature within a substrate, in accordance with some embodiments discussed herein. The substrate 1000 is provided with a substrate body 1002. The substrate body 1002 defines a first surface 1003 and an alignment feature 1005 in the first surface 1003. As described herein, the alignment feature 1005 may be configured to receive a protrusion of an adapter (e.g., adapter 670) to ensure proper alignment of the adapter onto the substrate 1000. However, in other embodiments, the alignment feature 1005 may be configured to receive the first section 679 (FIG. 6B) of the clip 676. The alignment feature 1005 may be a trench in some embodiments, and the trench may be configured to retain the protrusion of the adapter in some embodiments. In some embodiments, the alignment feature 1005 may be etched into the substrate body 1002. In some embodiments, the alignment feature 1005 may be provided outside of the optical area. The alignment feature may advantageously permit passive alignment of the adapter 670 with the substrate 1000 and waveguides therein.

As illustrated in FIG. 10, the alignment feature 1005 may be approximately 0.22 mm in depth (measured vertically in FIG. 10), and the alignment feature 1005 may be approximately 0.82 mm in width (measured horizontally in FIG. 10). The substrate body 1002 of the substrate 1000 may be approximately 0.7 mm in thickness (measured vertically in FIG. 10).

Figure 11:
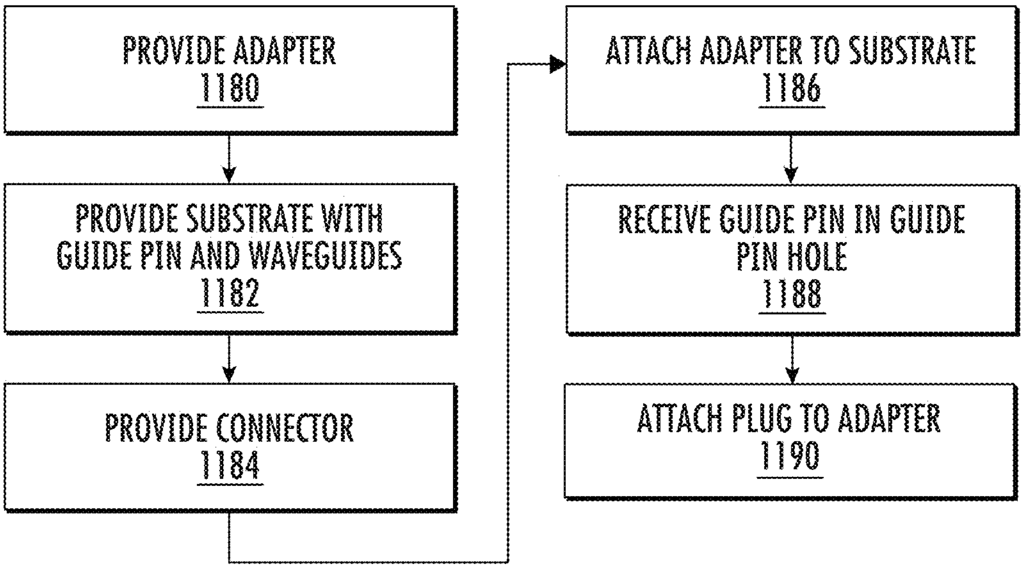
FIG. 11 is a flow chart illustrating an example method for aligning a substrate with optical fibers, in accordance with some embodiments discussed herein.

FIG. 11 is a flow chart illustrating an example method for aligning a substrate with one or more optical fibers, in accordance with some embodiments discussed herein.

Various components are provided. An adapter is provided at operation 1180, and the adapter may have a pair of opposing walls defining a spacing between the opposing walls. A substrate with at least one guide pin and one or more waveguides is provided at operation 1182. The guide pins may define a first end and a second end. The substrate may also comprise a substrate body, and the substrate body may have a receiving feature that removably or permanently connects with the first end of the guide pin. The second end of the guide pin may extend outwardly from the substrate body.

Other components may also be provided. A connector is provided at operation 1184 that comprises a plug, and the plug may define at least one guide pin hole and include one or more optical fibers. The plug may also include a ferrule with a guide pin hole.

At operation 1186, the adapter is attached to the substrate, such as described herein. Then, at operation 1188, the guide pin is received within the guide pin hole of the plug and/or the guide pin hole of the ferrule. Finally, at operation 1190, the plug is attached into the adapter thereby causing alignment of the optical fibers with the waveguides of the substrate, such as described herein.

Various approaches may be taken to assemble a system for aligning a substrate with one or more optical fibers. FIG. 11 is one example flow chart illustrating operations that may be performed to align a substrate with one or more optical fibers. Operations described herein may be performed in any order unless otherwise noted. Further, additional operations may be performed, and some operations may be omitted.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A system for aligning a substrate with an optical fiber, the system comprising:
- the optical fiber;
- the substrate comprising:
  - one or more optical waveguides,
  - at least one guide pin defining a first end and a second end, and
  - a substrate body comprising a receiving feature configured to receive and connect to the first end of the at least one guide pin, wherein the first end for the at least one guide pin is received and connected within the substrate body and the second end for the at least one guide pin extends outwardly from the substrate body;
- an adapter comprising a pair of opposing walls defining a spacing between the pair of opposing walls, wherein a spacing size of the spacing corresponds to a thickness of the substrate body, wherein the adapter is configured to receive and connect to the substrate body between the pair of opposing walls, wherein the at least one guide pin is permanently attached to the substrate body via the receiving feature and extends at least partially within the adapter; and
- a plug defining at least one guide pin hole that is configured to receive the second end of the at least one guide pin when the plug is inserted into the adapter, wherein the plug is configured to receive and connect to the optical fiber,
- wherein the adapter and the plug are configured to be connected together, and wherein the second end for the at least one guide pin is configured to engage with the at least one guide pin hole to align the optical fiber of the plug with the one or more optical waveguides, and wherein connection of the adapter and the substrate body and connection of the adapter and the plug restrains movement of the optical fiber relative to the substrate, wherein the adapter comprises a clip, wherein the clip comprises a first section extending into and biased toward the spacing, wherein the first section defines a taper leading upwardly toward a top engagement portion, wherein the taper causes the first section to retract as the adapter receives the substrate body to enable insertion of the substrate body, and wherein the top engagement portion is configured to provide a force against the substrate body when the substrate body is positioned between the pair of opposing walls so as to aid in connection of the adapter to the substrate.

2. The system of claim 1, wherein the first section is configured to shift depending on an amount of force applied to the first section so that the spacing size varies.

3. The system of claim 1, wherein the substrate body defines a first surface and an alignment feature in the first surface, wherein the alignment feature is configured to receive a protrusion of the adapter to aid in alignment of the adapter during connection of the adapter to the substrate.

4. The system of claim 1, wherein the plug is a Multi-fiber Push-on (MPO) connector.

5. The system of claim 1, further comprising adhesive that is configured to permanently connect the adapter and the substrate together.

6. The system of claim 1, wherein the plug further comprises a ferrule and a spring, wherein the ferrule is positioned between the substrate and the spring, wherein the ferrule is configured to receive the optical fiber and the at least one guide pin, wherein, when the at least one guide pin is shifted towards the plug, the spring generates a force against the ferrule and urges the ferrule towards the substrate.

7. The system of claim 6, wherein the spring is configured to urge the ferrule against the substrate.

8. The system of claim 6, wherein the ferrule is a Mechanical Transfer (MT) ferrule.

9. The system of claim 6, further comprising an anti-reflection coating or an index matching material, wherein the optical fiber comprises an end-face, wherein the spring is configured to urge the ferrule proximate to the substrate while leaving a gap between the end-face of the optical fiber and the one or more optical waveguides of the substrate, wherein the anti-reflection coating or the index matching material is deposited against the end-face.

10. The system of claim 6, wherein the force generated by the spring is between 1 N and 25 N and an anti-reflection coating or an index matching material contacts the optical fiber and the one or more optical waveguides.

11. The SN stem of claim 6, wherein the force generated by the spring is between 1 N and 5 N and an anti-reflection coating or an index matching material contacts the optical fiber and the one or more optical waveguides.

12. The system of claim 1, wherein the adapter is configured to removably connect or permanently connect to the substrate body, wherein the plug is configured to permanently connect to the optical fiber, and wherein the adapter and the plug are configured to be removably connected together.

13. The system of claim 1, wherein the receiving feature is a trench, wherein the trench comprises two side edges and a bottom surface, wherein the trench is configured so that the at least one guide pin rests against the two side edges without contacting the bottom surface.

14. The system of claim 1, wherein the receiving feature is a trench, wherein the trench comprises at least two side walls, wherein the trench is configured so that the at least one guide pin rests against the at least two side walls.

15. The system of claim 13, wherein the trench is formed using a laser based approach.

16. The system of claim 1, wherein the system comprises an attachment, wherein the receiving feature is provided on the attachment and the substrate is configured to receive and connect with the attachment.

17. The system of claim 1, wherein the one or more optical waveguides are buried optical waveguides.

18. The system of claim 1, wherein the one or more optical waveguides are surface optical waveguides.

19. An assembly for aligning a substrate with an optical fiber, the assembly comprising:

the substrate comprising:

one or more optical waveguides, at least one guide pin defining a first end and a second end, and a substrate body comprising a receiving feature configured to receive and connect to the first end of the at least one guide pin, wherein the first end for the at least one guide pin is received and connected within the substrate body and the second end for the at least one guide pin extends outwardly from the substrate body; and an adapter comprising a pair of opposing walls defining a spacing between the pair of opposing walls, wherein a spacing size of the spacing corresponds to a thickness of the substrate body, wherein the adapter is configured to receive and connect to the substrate body between the pair of opposing walls, wherein the at least one guide pin is permanently attached to the substrate body via the receiving feature and extends at least partially within the adapter, wherein the adapter comprises a clip, wherein the clip comprises a first section extending into and biased toward the spacing, wherein the first section defines a taper leading upwardly toward a top engagement portion, wherein the taper causes the first section to retract as the adapter receives the substrate body to enable insertion of the substrate body, and wherein the top engagement portion is configured to provide a force against the substrate body when the substrate body is positioned between the pair of opposing walls so as to aid in connection of the adapter to the substrate.

* * * * *